United States Patent
Tremblay et al.

(10) Patent No.: US 8,782,553 B2
(45) Date of Patent: Jul. 15, 2014

(54) HUMAN-MACHINE-INTERFACE AND METHOD FOR MANIPULATING DATA IN A MACHINE VISION SYSTEM

(75) Inventors: Robert Tremblay, Grafton, MA (US); Brian Phillips, Sherborn, MA (US); John Keating, Medway, MA (US); Andrew Eames, Ashland, MA (US); Steven M. Whitman, Danville, NH (US); Brian Mirtich, Medfield, MA (US); Carroll McNeill Arbogast, Jr., Needham, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 12/862,135

(22) Filed: Aug. 24, 2010

(65) Prior Publication Data

US 2010/0318936 A1  Dec. 16, 2010

Related U.S. Application Data

(60) Division of application No. 11/616,726, filed on Dec. 27, 2006, now Pat. No. 8,127,247, which is a continuation-in-part of application No. 11/138,025, filed on May 26, 2005, now Pat. No. 8,243,986, which is a continuation-in-part of application No. 11/059,512, filed on Feb. 16, 2005, now abandoned, which is a continuation-in-part of application No. 10/865,155, filed on Jun. 9, 2004.

(51) Int. Cl.
*G06F 3/048* (2013.01)

(52) U.S. Cl.
USPC .......................................... 715/788; 715/970

(58) Field of Classification Search
USPC .................................................. 715/970, 788
See application file for complete search history.

(56) References Cited

U.S. PATENT DOCUMENTS

| 4,214,265 A | 7/1980 | Olesen |
| 4,292,666 A | 9/1981 | Hill et al. |
| 4,647,979 A | 3/1987 | Urata |
| 4,847,772 A | 7/1989 | Michalopoulos et al. |

(Continued)

FOREIGN PATENT DOCUMENTS

| DE | 10012715 | 9/2000 |
| DE | 10040563 | 2/2002 |

(Continued)

OTHER PUBLICATIONS

Analog Devices, Inc., "ADSP-BF533 Blackfin Processor Hardware Reference", Mar. 2003, p. 936, Published in: Norwood, MA USA.

(Continued)

*Primary Examiner* — Andrea Leggett

(57) ABSTRACT

This invention provides a Graphical User Interface (GUI) that operates in connection with a machine vision detector or other machine vision system, which provides a highly intuitive and industrial machine-like appearance and layout. The GUI includes a centralized image frame window surrounded by panes having buttons and specific interface components that the user employs in each step of a machine vision system set up and run procedure. One pane allows the user to view and manipulate a recorded filmstrip of image thumbnails taken in a sequence, and provides the filmstrip with specialized highlighting (colors or patterns) that indicate useful information about the underlying images. The programming of logic is performed using a programming window that includes a ladder logic arrangement.

23 Claims, 17 Drawing Sheets

(56) References Cited

U.S. PATENT DOCUMENTS

| | | |
|---|---|---|
| 4,916,640 A | 4/1990 | Gasperi |
| 4,962,538 A | 10/1990 | Eppler et al. |
| 4,972,494 A | 11/1990 | White et al. |
| 5,018,213 A | 5/1991 | Sikes |
| 5,040,056 A | 8/1991 | Sager et al. |
| 5,121,201 A | 6/1992 | Seki |
| 5,146,510 A | 9/1992 | Cox et al. |
| 5,164,998 A | 11/1992 | Reinsch et al. |
| 5,177,420 A | 1/1993 | Wada |
| 5,184,217 A | 2/1993 | Doering |
| 5,198,650 A | 3/1993 | Wike et al. |
| 5,210,798 A | 5/1993 | Ekchian et al. |
| 5,233,541 A | 8/1993 | Corwin et al. |
| 5,262,626 A | 11/1993 | Goren et al. |
| 5,271,703 A | 12/1993 | Lindqvist et al. |
| 5,286,960 A | 2/1994 | Longacre, Jr. et al. |
| 5,298,697 A | 3/1994 | Suzuki et al. |
| 5,317,645 A | 5/1994 | Perozek et al. |
| 5,345,515 A | 9/1994 | Nishi et al. |
| 5,365,596 A | 11/1994 | Dante et al. |
| 5,420,409 A | 5/1995 | Longacre, Jr. et al. |
| 5,476,010 A | 12/1995 | Fleming et al. |
| 5,481,712 A | 1/1996 | Silver et al. |
| 5,581,625 A | 12/1996 | Connell et al. |
| 5,687,249 A | 11/1997 | Kato |
| 5,717,834 A | 2/1998 | Werbin et al. |
| 5,734,742 A | 3/1998 | Asaeda et al. |
| 5,742,037 A | 4/1998 | Scola et al. |
| 5,751,831 A | 5/1998 | Ono |
| 5,802,220 A | 9/1998 | Black et al. |
| 5,809,161 A | 9/1998 | Auty et al. |
| 5,825,483 A | 10/1998 | Michael et al. |
| 5,852,669 A | 12/1998 | Eleftheriadis et al. |
| 5,872,354 A | 2/1999 | Hanson |
| 5,917,602 A | 6/1999 | Bonewitz et al. |
| 5,929,418 A | 7/1999 | Ehrhart et al. |
| 5,932,862 A | 8/1999 | Hussey et al. |
| 5,937,096 A | 8/1999 | Kawai |
| 5,942,741 A | 8/1999 | Longacre et al. |
| 5,943,432 A | 8/1999 | Gilmore et al. |
| 5,960,097 A | 9/1999 | Pfeiffer et al. |
| 5,960,125 A | 9/1999 | Michael et al. |
| 5,966,457 A | 10/1999 | Lemelson |
| 6,046,764 A | 4/2000 | Kirby et al. |
| 6,049,619 A | 4/2000 | Anandan et al. |
| 6,061,471 A | 5/2000 | Coleman, Jr. et al. |
| 6,072,494 A | 6/2000 | Nguyen |
| 6,072,882 A | 6/2000 | White et al. |
| 6,075,882 A | 6/2000 | Mullins et al. |
| 6,078,251 A | 6/2000 | Landt et al. |
| 6,088,467 A | 7/2000 | Sarpeshkar et al. |
| 6,115,480 A | 9/2000 | Washizawa |
| 6,158,661 A | 12/2000 | Chadima, Jr. et al. |
| 6,160,494 A | 12/2000 | Sodi et al. |
| 6,161,760 A | 12/2000 | Marrs |
| 6,169,535 B1 | 1/2001 | Lee |
| 6,169,600 B1 | 1/2001 | Ludlow |
| 6,173,070 B1 | 1/2001 | Michael et al. |
| 6,175,644 B1 | 1/2001 | Scola et al. |
| 6,175,652 B1 | 1/2001 | Jacobson et al. |
| 6,184,924 B1 | 2/2001 | Schneider et al. |
| 6,215,892 B1 | 4/2001 | Douglass et al. |
| 6,282,462 B1 | 8/2001 | Hopkins |
| 6,285,787 B1 | 9/2001 | Kawachi et al. |
| 6,298,176 B2 | 10/2001 | Longacre, Jr. et al. |
| 6,301,610 B1 * | 10/2001 | Ramser et al. ............ 709/208 |
| 6,333,993 B1 | 12/2001 | Sakamoto |
| 6,346,966 B1 | 2/2002 | Toh |
| 6,347,762 B1 | 2/2002 | Sims et al. |
| 6,360,003 B1 | 3/2002 | Doi et al. |
| 6,396,517 B1 | 5/2002 | Beck et al. |
| 6,396,949 B1 | 5/2002 | Nichani |
| 6,408,429 B1 | 6/2002 | Marrion et al. |
| 6,446,868 B1 | 9/2002 | Robertson et al. |
| 6,483,935 B1 | 11/2002 | Rostami et al. |
| 6,487,304 B1 | 11/2002 | Szeliski |
| 6,525,810 B1 | 2/2003 | Kipman |
| 6,526,156 B1 | 2/2003 | Black et al. |
| 6,539,107 B1 | 3/2003 | Michael et al. |
| 6,542,692 B1 | 4/2003 | Houskeeper |
| 6,545,705 B1 | 4/2003 | Sigel et al. |
| 6,549,647 B1 | 4/2003 | Skunes et al. |
| 6,573,929 B1 | 6/2003 | Glier et al. |
| 6,580,810 B1 | 6/2003 | Yang et al. |
| 6,587,122 B1 * | 7/2003 | King ............................ 715/708 |
| 6,597,381 B1 | 7/2003 | Eskridge et al. |
| 6,608,930 B1 | 8/2003 | Agnihotri et al. |
| 6,618,074 B1 | 9/2003 | Seeley et al. |
| 6,621,571 B1 | 9/2003 | Maeda et al. |
| 6,625,317 B1 | 9/2003 | Gaffin et al. |
| 6,628,805 B1 | 9/2003 | Hansen et al. |
| 6,629,642 B1 | 10/2003 | Swartz et al. |
| 6,646,244 B2 | 11/2003 | Aas et al. |
| 6,668,075 B1 | 12/2003 | Nakamura |
| 6,677,852 B1 | 1/2004 | Landt |
| 6,681,151 B1 | 1/2004 | Weinzimmer et al. |
| 6,714,213 B1 | 3/2004 | Lithicum et al. |
| 6,741,977 B1 | 5/2004 | Nagaya et al. |
| 6,753,876 B2 | 6/2004 | Brooksby et al. |
| 6,761,316 B2 | 7/2004 | Bridgelall |
| 6,766,414 B2 | 7/2004 | Francis |
| 6,774,917 B1 | 8/2004 | Foote et al. |
| 6,816,063 B2 | 11/2004 | Kubler |
| 6,817,982 B2 | 11/2004 | Fritz et al. |
| 6,919,793 B2 | 7/2005 | Heinrich |
| 6,943,842 B2 | 9/2005 | Stavely et al. |
| 6,944,584 B1 | 9/2005 | Tenney et al. |
| 6,973,209 B2 | 12/2005 | Tanaka |
| 6,985,827 B2 | 1/2006 | Williams et al. |
| 6,987,528 B1 | 1/2006 | Nagahisa et al. |
| 6,997,556 B2 | 2/2006 | Pfleger |
| 6,999,625 B1 | 2/2006 | Nelson et al. |
| 7,062,071 B2 | 6/2006 | Tsujino et al. |
| 7,066,388 B2 | 6/2006 | He |
| 7,070,099 B2 | 7/2006 | Patel |
| 7,085,401 B2 | 8/2006 | Averbuch et al. |
| 7,088,387 B1 | 8/2006 | Freeman et al. |
| 7,088,846 B2 | 8/2006 | Han et al. |
| 7,097,102 B2 | 8/2006 | Patel et al. |
| 7,175,090 B2 | 2/2007 | Nadabar |
| 7,181,066 B1 | 2/2007 | Wagman |
| 7,227,978 B2 | 6/2007 | Komatsuzaki et al. |
| 7,266,768 B2 | 9/2007 | Ferlitsch et al. |
| 7,274,808 B2 | 9/2007 | Baharav et al. |
| 7,280,685 B2 | 10/2007 | Beardsley |
| 7,604,174 B2 | 10/2009 | Gerst et al. |
| 7,657,081 B2 | 2/2010 | Blais et al. |
| 7,751,625 B2 | 7/2010 | Ulrich et al. |
| 7,984,854 B2 | 7/2011 | Nadabar |
| 8,108,176 B2 | 1/2012 | Nadabar et al. |
| 8,156,880 B2 | 4/2012 | Vilnes |
| 2001/0042789 A1 | 11/2001 | Krichever et al. |
| 2002/0005895 A1 | 1/2002 | Freeman et al. |
| 2002/0037770 A1 | 3/2002 | Paul et al. |
| 2002/0099455 A1 | 7/2002 | Ward |
| 2002/0122582 A1 | 9/2002 | Masuda et al. |
| 2002/0177918 A1 | 11/2002 | Pierel et al. |
| 2002/0181405 A1 | 12/2002 | Ying |
| 2002/0196336 A1 | 12/2002 | Batson et al. |
| 2002/0196342 A1 | 12/2002 | Walker et al. |
| 2003/0062418 A1 | 4/2003 | Barber et al. |
| 2003/0095710 A1 | 5/2003 | Tessadro |
| 2003/0113018 A1 | 6/2003 | Nefian et al. |
| 2003/0120714 A1 * | 6/2003 | Wolff et al. ................... 709/200 |
| 2003/0137590 A1 | 7/2003 | Barnes et al. |
| 2003/0201328 A1 | 10/2003 | Jam et al. |
| 2003/0219146 A1 | 11/2003 | Jepson et al. |
| 2003/0227483 A1 | 12/2003 | Schultz et al. |
| 2004/0148057 A1 | 7/2004 | Breed et al. |
| 2004/0218806 A1 | 11/2004 | Miyamoto et al. |
| 2004/0220770 A1 | 11/2004 | Isumi et al. |
| 2005/0184217 A1 | 8/2005 | Kong et al. |
| 2005/0226490 A1 | 10/2005 | Phillips et al. |
| 2005/0254106 A9 | 11/2005 | Silverbrook et al. |

(56) References Cited

U.S. PATENT DOCUMENTS

| | | |
|---|---|---|
| 2005/0257646 A1 | 11/2005 | Yeager |
| 2005/0275728 A1 | 12/2005 | Mirtich et al. |
| 2005/0275831 A1 | 12/2005 | Silver |
| 2005/0275833 A1 | 12/2005 | Silver |
| 2005/0275834 A1 | 12/2005 | Silver |
| 2005/0276445 A1 | 12/2005 | Silver et al. |
| 2005/0276459 A1 | 12/2005 | Eames et al. |
| 2005/0276460 A1 | 12/2005 | Silver et al. |
| 2005/0276461 A1 | 12/2005 | Silver et al. |
| 2005/0276462 A1 | 12/2005 | Silver et al. |
| 2006/0022052 A1 | 2/2006 | Patel et al. |
| 2006/0093205 A1 | 5/2006 | Bryll et al. |
| 2006/0107211 A1 | 5/2006 | Mirtich et al. |
| 2006/0107223 A1 | 5/2006 | Mirtich et al. |
| 2006/0131419 A1 | 6/2006 | Nunnink |
| 2006/0133757 A1 | 6/2006 | Nunnink |
| 2006/0146337 A1 | 7/2006 | Marshall et al. |
| 2006/0146377 A1 | 7/2006 | Marshall et al. |
| 2006/0223628 A1 | 10/2006 | Walker et al. |
| 2006/0249581 A1 | 11/2006 | Smith et al. |
| 2006/0283952 A1 | 12/2006 | Wang |
| 2007/0009152 A1 | 1/2007 | Kanda |
| 2007/0146491 A1 | 6/2007 | Tremblay et al. |
| 2007/0181692 A1 | 8/2007 | Barkan et al. |
| 2008/0004822 A1 | 1/2008 | Nadabar et al. |
| 2008/0011855 A1 | 1/2008 | Nadabar |
| 2008/0036873 A1 | 2/2008 | Silver |
| 2008/0063245 A1 | 3/2008 | Benkley et al. |
| 2008/0166015 A1 | 7/2008 | Haering et al. |
| 2008/0167890 A1* | 7/2008 | Pannese et al. .................. 705/1 |
| 2008/0205714 A1 | 8/2008 | Benkley |
| 2008/0219521 A1 | 9/2008 | Benkley |
| 2008/0226132 A1 | 9/2008 | Gardner et al. |
| 2008/0285802 A1* | 11/2008 | Bramblet et al. ............. 382/103 |
| 2008/0309920 A1 | 12/2008 | Silver |
| 2008/0310676 A1 | 12/2008 | Silver |
| 2009/0121027 A1 | 5/2009 | Nadabar |
| 2009/0154779 A1 | 6/2009 | Satyan et al. |
| 2009/0257621 A1 | 10/2009 | Silver |
| 2009/0273668 A1 | 11/2009 | Mirtich et al. |
| 2010/0241901 A1 | 9/2010 | Roland et al. |
| 2010/0241911 A1 | 9/2010 | Yun-Yi |
| 2010/0241981 A1 | 9/2010 | Mirtich et al. |
| 2010/0318936 A1 | 12/2010 | Tremblay et al. |

FOREIGN PATENT DOCUMENTS

| | | |
|---|---|---|
| EP | 0939382 | 9/1999 |
| EP | 0815688 | 5/2000 |
| EP | 0896290 | 10/2004 |
| EP | 1469420 | 10/2004 |
| EP | 1734456 A1 | 12/2006 |
| EP | 1975849 | 10/2008 |
| GB | 2226130 | 6/1990 |
| GB | 2309078 | 7/1997 |
| JP | 60147602 | 8/1985 |
| JP | S62-113002 | 5/1987 |
| JP | H8122016 | 5/1996 |
| JP | 08-313454 | 11/1996 |
| JP | 09-178670 | 7/1997 |
| JP | 09185710 | 7/1997 |
| JP | 9-288060 | 11/1997 |
| JP | 11-101689 | 4/1999 |
| JP | 2000-84495 | 3/2000 |
| JP | 2000-227401 | 8/2000 |
| JP | 2000-293694 | 10/2000 |
| JP | 2000298103 | 10/2000 |
| JP | 2000-322450 | 11/2000 |
| JP | 2001-109884 | 4/2001 |
| JP | 2001-194323 | 7/2001 |
| JP | 2002-148201 | 5/2002 |
| JP | 2002-148205 | 5/2002 |
| JP | 2002-214153 | 7/2002 |
| JP | 2002288633 | 10/2002 |
| JP | 2002318202 | 10/2002 |
| JP | 2003270166 | 9/2003 |
| JP | 2004-145504 | 5/2004 |
| WO | WO-96-09597 | 3/1996 |
| WO | WO-0141068 | 6/2001 |
| WO | WO-0215120 | 2/2002 |
| WO | WO-02075637 | 9/2002 |
| WO | WO-03102859 | 12/2003 |
| WO | WO-2005050390 | 6/2005 |
| WO | WO-2005124317 | 6/2005 |
| WO | WO-2005124709 | 12/2005 |
| WO | WO-2005124719 | 12/2005 |
| WO | WO-2008118419 | 10/2008 |
| WO | WO-2008118425 | 10/2008 |

OTHER PUBLICATIONS

Analogic Computers LTD., "Bio-inspired Real-time Very High Speed Image Processing Systems", Sep. 24, 2004, p. 3, Publisher: Analogic Computers Ltd., Published in: Budapest, Hungary.

Stamp et al, "The application of knowledge based vision to closed-loop control of the injection molding process", 1997, pp. 605-616, vol. 3164, Publisher: SPIE-Int., Published in: USA.

Avalon Vision Solutions, "If accuracy matters in your simplest vision application Use the Validator".

Vietze, Oliver, "Miniaturized Vision Sensors for Process Automation".

Baumer Optronic, "Technische Daten", , p. 6, Published in: Baumer Optronic.

Analogic Computers LTD., "Bio-insired Real-Time ", , p. 1, Publisher: AnaLogic Computers Ltd.

Analog Devices, Inc., "Blackfin Processor Instruction Set Reference", May 2003, p. 514, Published in: Norwood, MA USA.

Vision Solutions, "Captura! Video Event Monitoring Solutions", , p. 2, Publisher: EPIC Vision Solutions.

Mauro et al, "Check! a generic and specific industrial inspection", Dec. 22, 1995, p. 5, vol. 143, No. 4, Publisher: Image Signal Process, Published in: Manchester, UK.

Wilson, Andrew, "CMOS and CCD-Application Drives Imaging Technology ", Dec. 7, 2007, p. 4, vol. 4, Publisher: Aegis Electronic Group Inc., Published in: USA.

Cognex Corporation, "Cognex VisionPro Getting Started", 2004, pp. 1-28, Publisher: Cognex Corporation, Published in: US.

Chen, Y.H., "Computer Vision for General Purpose Visual Inspection: a Fuzzy Logic Approach", 1995, pp. 181-192, Publisher: Elsevier Science Limited, Published in: Pokfulam, Hong Kong.

"Design Philosophy", , p. 4.

Sensopart, "Mounting and Operating InstructionsSensopart", Oct. 2005, p. 57, Published in: USA.

RVSI, "Smart Camera Reader for Directly Marked Data Matrix Codes", , p. 2, Publisher: HawkKey 1515.

Haering, N., "XP-002357960", 2006, p. 42, Publisher: Kluwer Academin Publishers.

Matrox, "Interactive Windows Imaging Software for Industrial and Scientific Applications", , p. 8, Publisher: Matrox Imaging.

IBM, "Software controls for automated inspection device used to check interposer buttons for defects", Mar. 27, 2003, p. 6.

Keyence America, "CV-2100 Series high-Speed Digital Machine Vision System", Dec. 29, 2003, p. 15, Publisher: Keyence America, Published in: USA.

National Instruments, "LabView and IMAQ Vision Builder Provide Automated Visual Test System", 2001, p. 2, Publisher: Customer Solutions, Published in: Ontario CANADA.

National Semiconductor, "LM9630 100 x 580 fps Ultra Sensitive Monochrome CMOS Image Sensor", 2000, p. 21, Publisher: National Semiconductor Corporation.

Hunt, Shane, "PhotoDraw 2000", , p. 5, Publisher: Sybex.

Global Network Services, "Imagecheckers Industrial Machine Vision", "Matsushita Electric Works", 2003, Publisher: Global Network Services, Published in: New Providence, NJ USA.

Olymus Industrial, "Olympus i-speed", , p. 16 Publisher: Olympus Industrial.

(56) References Cited

OTHER PUBLICATIONS

Uno et al, "A Method of Real-Time Recognition of Moving Objects and Its Application", Nov. 1975, p. 8, Publisher: Taga Works Hitachi Ltd., Published in: Hitachi-Shi, JP.
Cognex Corporation, "Sensopart FA45 Vision Sensor", Sep. 29, 2006, p. 22, Publisher: Cognex Corporation, Published in: USA.
SICK, "Intelligent Camera Sensor", Feb. 2005, p. 60 Publisher: SICK, Published in: Waldrich, Deutschland.
"SmartCapture Tool", 2003, pp. 1-25, Publisher: Visionx Inc., Published in: US.
National Instruments, "IMAQ Vision Builder Tutorial ", Dec. 2002, p. 70, Publisher: National Instuments, Published in: USA.
IO Industries, "High Speed Digital Video Recording Software 4.0", 2002, p. 2, Publisher: IO Industries, Inc., Published in: Ontario, Canada.
Wilson, Andrew, "Cellular device processes at Ultrafast speeds", Feb. 2003, p. 3, Publisher: PennWell.
Demotte, Donald, "Machine Vision for Robot Guidance Workshop", May 5, 2004, p. 15, Published in: USA.
Khan, P., "Building blocks for Computer Vision Systems", Dec. 1993, pp. 40-50, vol. 8, No. 6, Publisher: IEEE Expert, Published in: US.
Whelan, P. et al, "Machine Vision Algorithms in Java", 2001, pp. 1-19, Publisher: Springer-Verlag.
Integrated Design Tools, Inc., "High-Speed CMOS Digital Camera", 2000, p. 103, Publisher: IDT, Published in: USA.
10-K SEC Filing—iQ 180 Products, Adaptive Optics Associates 900 Coles Road, Blackwood, NJ 08012-4683, Dec. 2003.
ADSP-BF533 Blackfin Processor Hardware Reference, Analog Devices Inc.—Media Platforms and Services Group, Preliminary Revision—Part No. 82-002005-01, Mar. 2003.
Apple Computer Inc., Studio Display User's Manual online, retrieved on Nov. 24, 2010, retrieved from the Internet http://manuals.info.apple.com/en/studioDisplay_15inLCDUserManual.pdf, 1998.
Asundi, A. et al., "High-Speed TDI Imaging for Peripheral Inspection", Proc. SPIE vol. 2423, Machine Vision Applications in Industrial Inspection III, Frederick Y. Wu; Stephen S. Wilson; Eds., , pp. 189-194 Mar. 1995.
Avalon Vision Solutions, "If accuracy matters in your simplest vision applications Use the Validator", 2006.
Baillard, C. et al., "Automatic Reconstruction of Piecewise Planar Models from Multiple Views", CVPR, vol. 2, No. 2, 1999.
Baumer Optronic, "Technishche Daten", www.baumeroptronic.com, Product Brochure, Apr. 2006.
Bi-i, AnaLogic Computers Ltd., 2003.
Bi-i: Bio-inspired Real-Time Very High Speed Image Processing Systems, AnaLogic Computers Ltd., http://www.analogic-computers.com/cgi-bin/phprint21.php,(2004).
Blackfin Processor Instruction Set Reference, Analog Devices, Inc., Revision 2.0, Part No. 82-000410-14, May 2003.
Cellular device processes at ultrafast speeds, VisionSystems Design, PenWell Corp., Feb. 2003.
Chang, Dingding et al., "Feature Detection of Moving Images using a Hierarchical Relaxation Method", IEICE TRANS. INF . & SYST ., vol. E79-D, (Jul. 7, 1996).
Chen, Y. H., "Computer Vision for General Purpose Visual Inspection: a Fuzzy Logic Approach", Optics and Lasers in Engineering 22, Elsevier Science Limited, vol. 22, No. 3, 1995, pp. 182-192.
Cognex Corporation, "Screen shot of the CheckMate GUI Ver 1.6", Jan. 2005.
Cognex Corporation, "Sensorpart FA45 Vision Sensor", Sep. 29, 2006.
Cognex VisionPro, Getting Started—QuickStart Tutorial, Cognex Corporation, 590-6560, Revision 3.5, May 2004, pp. 69-94.
Cordin Company, "Electronic Imaging Systems", High Speed Imaging Solutions: 200-500 Series Cameras, Aug. 4, 2004.
CV-2100 Series, Keyence America http://www.keyence.com/products/vision/cv_2100_spec.html, High-Speed Digital Machine Vision System, Dec. 29, 2003.
Demotte, Donald "Visual Line Tracking", Application Overview & Issues Machine Vision for Robot Guidance Workshop, May 5, 2004.
Di Mauro, E. C., et al., "Check—a generic and specific industrial inspection tool", IEE Proc.-Vis. Image Signal Process., vol. 143, No. 4, Aug. 27, 1996, pp. 241-249.
Haering, N. et al., "Visual Event Detection", Kluwer Academic Publishers, Chapter 2, Section 8, 2001.
Hunt, Shane C., "Mastering Microsoft PhotoDraw 2000", SYBEX, Inc., San Francisco, May 21, 1999.
IBM, "Software Controls for Automated Inspection Device Used to Check Interposer Buttons for Defects", IP.com Journal, IP.com Inc., West Henrietts, NY, US, Mar. 27, 2003.
ICS 100—Intelligent Camera Sensor, SICK Product Information, SICK Industrial Sensors, 6900 West 110th Street, Minneapolis, MN 55438, www.sickusa.com, Jan. 3, 2002.
Integrated Design Tools, "High-Speed CMOS Digital Camera", X-Stream Vision User's Manual, 2000.
IO Industries, "High Speed Digital Video Recording Software 4.0", IO industries, Inc.—Ontario, CA, 2002.
Kahn, Phillip "Building blocks for computer vision systems", IEEE Expert, vol. 8, No. 6, XP002480004, Dec. 6, 1993, pp. 40-50.
Kim, Zuwhan et al., "Automatic Description of Complex Buildings with Multiple Images", IEEE 0-7695-0813-8/00, 2000, pp. 155-162.
KSV Instruments LTD., "HiSIS 2002—High Speed Imaging System", www.ksvltd.fi, Sep. 24, 2004.
Laser Scanning Product Guide, Adaptive Optics Associates—Industrial Products and Systems, 90 Coles Road, Blackwood, NJ 08012, Industrial Holographic and Conventional Laser 1D, Omnidirectional Bar Codes Scanners, Mar. 2003.
Lavision GMBH, "High Speed CCD/CMOS Camera Systems", Overview of state-of-the-art High Speed Digital Camera Systems—UltraSpeedStar, www.lavision.de, Sep. 24, 2004.
LM9630 100 x 128, 580 fps UltraSensitive Monochrome CMOS Image Sensor, National Semiconductor Corp., www.national.com, Rev. 1.0, Jan. 2004.
Matrox, "Interactive Windows Imaging Software for Industrial and Scientific Applications", Inspector 4.0—Matrox Imaging, Apr. 15, 2002.
Matsushita Imagecheckers, NAiS Machine Vision—Matsushita Machine Vision Systems, 2003.
Matsushita LightPix AE10, NAiS Machine Vision—Matsushita Machine Vision Systems, 2003.
National Instruments, "IMAQVision Builder Tutorial", IMAQ XP-002356530, http://www.ni.com/pdf/manuals/322228c.pdf, Dec. 2000.
Olympus Industrial, "High Speed, High Quality Imaging Systems", i-speed Product Brochure—Publisher Olympus Industrial, 2002.
Photron USA, "FASTCAM PCI", Sep. 24, 2004.
Photron USA, "FASTCAM-X 1280 PCI", Sep. 24, 2004.
Photron USA, "Ultima 1024", Sep. 24, 2004.
Photron USA, "Ultima 512", Sep. 24, 2004.
Photron USA, "Ultima APX", Sep. 24, 2004.
RVSI, "Smart Camera Reader for Directly Marked Data Matrix Codes", HawkEye 1515 with GUI, 2004.
SmartCapture Tool, Feature Fact Sheet, Visionx Inc., www.visionxinc.com, 2003.
Stemmer Imaging GMBH, "Going Multimedia with Common Vision Blox", Product News, www.stemmer-imaging.de, Mar. 3, 2004.
Uno, T. et al., "A Method of Real-Time Recognition of Moving Objects and its Application", Pattern Recognition; Pergamon Press, vol. 8, pp. 201-208, 1976, pp. 201-208.
Vietze, Oliver "Miniaturized Vision Sensors for Process Automation", Jan. 2, 2005.
Vision Solutions, "Capture! Video Event Monitoring Solutions", EPIC Vision Solutions.
Whelan, P. et al., "Machine Vision Algorithms in Java", Chapter 1—An Introduction to Machine Vision, Springer-Verlag, XP002480005, 2001.
Wilson, Andrew "CMOS/CCD sensors spot niche applications", Vision Systems Design, Jun. 2003.
Wright, Anne et al., "Cognachrome Vision System User's Guide", Newton Research Labs, Manual Edition 2.0, Documents Software Version 26.0, Jun. 3, 1996.

(56) References Cited

OTHER PUBLICATIONS

Allen-Bradley, "Bulletin 2803 VIM Vision Input Module", Cat. No. 2803—VIM2, Printed USA,(1991. Submitted in 3 parts.).
Allen-Bradley, "User's Manual", Bulletin 2803 VIM Vision Input Module, Cat. No. 2803-VIM1,(1987. Submitted in 2 parts).
Allen-Bradley, "Bulletin 5370 CVIM Configurable Vision Input Module", User Manual Cat. No. 5370-CVIM, (1995. Submitted in 3 parts.).
First Written Opinion, Singapore Patent Application No. 200608485-9, (Feb. 15, 2008).
Communication pursuant to 94(3) EPC, European Patent Application No., 05 758 780.0, dated Mar. 25, 2009, (Mar. 25, 2009).
Second Written Opinion, Singapore Patent Application No. 200608485-9, (Sep. 24, 2008).
The International Search Report and Written Opinion of the International Searching Authority, Application No. PCT/US2005/019923, (Jan. 19, 2006).
CCD/CMOS Sensors Spot Niche Application, PennWell Corporation, Vision System Design—Imaging and Machine Vision Technology, 2004.
Corke, Peter I., et al., "Real Time Industrial Machine Vision", Electrical Engineering Congress, Sydney, Australia, CSIRO Division of Manufacturing Technology, 1994.
CVL Vision Tools Guide, Cognex MVS-8000 Series, Chapter 5, Symbol Tool, CVL 5.4, Dec. 1999.
Denis, Jolivet "LabVIEW and IMAQ Vision Builder Provide Automated Visual Test System", Semiconductor: IMAQ Advanced Analysis Toolkit, IMAQ Vision Builder—LabVIEW—National Instruments—XP002356529—URL http://www.ni.com/pdf/csma/us/JNDESWG.pdf, 2001.
Marsh, R et al., "The application of knowledge based vision to closed-loop control of the injection molding process", SPIE vol. 3164, Faculty of Engineering University of the West of England United Kingdon, 1997, pp. 605-616.
Olympus Industrial, "Design Philosophy", i-speed, 2002.
Rohr, K. "Incremental Recognition of Pedestrians from Image Sequences", CVPR93, (1993).
Siemens AG, "Simatic Machine Vision", Simatic VS 100 Series, www.siemens.com/machine-vision, Apr. 1, 2003.
West, Perry C., High Speed, Real-Time Machine Vision, Imagenation and Automated Vision Systems, Inc., 2001.
Zarandy, A. et al., "Vision Systems Based on the 128X128 Focal Plane Cellular Visual Microprocessor Chips", IEEE, (Mar. 2003), pp. III-518-III-521.
Zarandy, Akos et al., "Ultra-High Frame Rate Focal Plane Image Sensor and Processor", IEEE Sensors Journal, vol. 2, No. 6, 2002.
Cognex Corporation, "3000/4000/5000 Vision Tools", revision 7.6, 590-0136, Chapter 13, (1996).
Cognex Corporation, "Cognex 3000/4000/5000", Vision Tools, Revision 7.6, 590-0136, Chapter 10 Auto-Focus.
Cognex 3000/4000/5000 Image Processing, Revision 7.4 590-0135 Edge Detection Tool, 1996.
Cognex 4000/5000 SMD Placement Guidance Package, User's Manual, Release 3.8.00, Chapter 15, pp. 590-6168, 1998.
Response to Office Action, dated Oct. 5, 2009, European Patent application No. 05758780.0.
Response to Written Opinion, Singapore patent No. 200608484-2, Dec. 11, 2009.
Japanese patent No. 2007-527,637, Response to Office Action, machine translated, dated Dec. 1, 2010.
Japanese patent No. 2007-527,637, Response to Office Action, machine translated, dated Aug. 1, 2011.
Japanese patent No. 2007-527,620, Office Action Response, machine translated, dated Jul. 19, 2011.
Response to Office Action, U.S. Appl. No. 10/865,155, dated Jun. 16, 2011, filed Dec. 15, 2011.
Office Action, U.S. Appl. No. 10/865,155, dated Jun. 16, 2011.
Notice of Allowance, U.S. Appl. No. 11/138,033, dated Jan. 11, 2010.
Response to Non-Final Office Action, U.S. Appl. No. 11/138,023, dated Jan. 9, 2008, filed Jun. 9, 2008.
Non-Final Office Action, U.S. Appl. No. 11/138,033, dated Jun. 14, 2010.
Office Action, Japan Application No. 2007-527,620, dated Jan. 18, 2011.
Non-Final Office Action, U.S. Appl. No. 11/138,023, dated Jan. 9, 2008.
Response to Office Action, Japan Application No. 2007-527,620, dated Jan. 18, 2011, filed Jul. 19, 2011.
Response to Office Action, U.S. Appl. No. 10/865,155, dated Jan. 10, 2011, filed May 10, 2011.
Response to Non-Final Office Action, U.S. Appl. No. 11/138,033, dated Jun. 14, 2010, filed Nov. 15, 2010.
Final Office Action, U.S. Appl. No. 11/138,033, dated Jan. 10, 2011.
Response to Final Office Action, U.S. Appl. No. 11/138,033, dated Jan. 10, 2011, filed Jun. 10, 2011.
Notice of Allowance, U.S. Appl. No. 11/138,033, dated Oct. 28, 2011.
Non-Final Office Action, U.S. Appl. No. 11/138,023, dated Jan. 22, 2009.
Response to Non-Final Office Action, U.S. Appl. No. 11/138,023, dated Jan. 22, 2009, filed May 26, 2009.
Amendment filed with Request for Continued Examination, U.S. Appl. No. 11/138,023, dated Aug. 25, 2011.
Notice of Allowance, U.S. Appl. 11/138,023, dated Sep. 6, 2011.
Office Action, Japan Application No. 2007-527,637, dated Jun. 1, 2010.
Response to Office Action, Japan Application No. 2007-527,637, Jun. 1, 2010, filed Dec. 1, 2010.
Office Action, Japan Application No. 2007-527,637, dated Feb. 1, 2011.
Response to Office Action, Japan Application No. 2007-527,637, dated Feb. 1, 2011, filed Aug. 1, 2011.
Non-Final Office Action, U.S. Appl. No. 10/865,155, dated Jan. 10, 2011.
Response to Non-Final Office Action, U.S. Appl. No. 10/865,155, dated Jan. 10, 2011, filed May 10, 2011.
Final Office Action, U.S. Appl. No. 10/865,155, dated Jun. 16, 2011.
Response to Final Office Action, U.S. Appl. No. 10/865,155, dated Jun. 16, 2011, filed Dec. 15, 2011.
Notice of Allowance, U.S. Appl. No. 11/136,019, dated Dec. 23, 2011.
Non-Final Office Action, U.S. Appl. No. 11/136,103, dated Dec. 10, 2007.
Response to Non-Final Office Action, U.S. Appl. No. 11/136,103, dated Dec. 10, 2007, filed Mar. 10, 2008.
Non-Final Office Action, U.S. Appl. No. 11/136,103, dated Nov. 13, 2008.
Response to Non-Final Office Action, U.S. Appl. No. 11/136,103, dated Nov. 13, 2008, filed Feb. 12, 2009.
Notice of Allowance, U.S. Appl. No. 11/136,103, dated May 1, 2008.
Amendment in Response to Notice of Allowance, U.S. Appl. No. 11/136,103, dated May 1, 2008, filed Jun. 23, 2008.
Notice of Allowance, U.S. Appl. No. 11/136,103, dated Mar. 23, 2009.
Amendment in Response to Notice of Allowance, U.S. Appl. No. 11/136,103, dated Mar. 23, 2009, filed Jun. 23, 2009.
Amendment, U.S. Appl. No. 11/136,103, filed Dec. 18, 2009.
Notice of Allowance, U.S. Appl. No. 11/136,103, dated Feb. 21, 2012.
Non-Final Office Action, U.S. Appl. No. 11/769,494, dated Jun. 29, 2011.
Response to Non-Final Office Action, U.S. Appl. No. 11/769,494, dated Jun. 29, 2011, dated Dec. 28, 2011.
Final Office Action, U.S. Appl. No. 11/769,494, dated Jan. 11, 2012.
Non-Final Office Action, U.S. Appl. No. 11/059,512, dated Jul. 6, 2007.
Response to Non-Final Office Action, U.S. Appl. No. 11/059,512, dated Jul. 6, 2007, filed Dec. 4, 2007.
Final Office Action, U.S. Appl. No. 11/059,512, dated Apr. 25, 2008.
Response to Final Office Action, U.S. Appl. No. 11/059,512, dated Apr. 25, 2008, filed Sep. 23, 2008.
Non-Final Office Action, U.S. Appl. No. 11/059,512, dated Dec. 18, 2008.

(56) References Cited

OTHER PUBLICATIONS

Amendment, U.S. Appl. No. 11/138,033, dated Dec. 18, 2009.
Response to Non-Final Office Action, U.S. Appl. No. 11/138,023, dated Jan. 9, 2008, dated Jun. 9, 2008.
Non-Final Office Action, U.S. Appl. No. 11/138,025, dated Dec. 19, 2008.
Response to Non-Final Office Action, U.S. Appl. No. 11/138,025, dated Dec. 19, 2008, filed Apr. 8, 2009.
Restriction Requirement, U.S. Appl. No. 11/138,025, dated Jul. 21, 2009.
Response to Restriction Requirement, U.S. Appl. No. 11/138,025, dated Jul. 21, 2009, filed Sep. 21, 2009.
Notice of Allowance, U.S. Appl. No. 11/138,025, dated Dec. 28, 2011.
Office Action, European Patent Application No. 05763341.4, dated Jun. 13, 2007.
Response to Office Action, European Patent Application No. 05763341.4, dated Jun. 13, 2007, filed Dec. 24, 2007.
Office Action, European Patent Application No. 05763341.4, dated Mar. 25, 2009.
Response to Office Action, European Patent Application No. 05763341.4, dated Mar. 25, 2009, filed Oct. 1, 2009.
Office Action, European Patent Application No. 05763341.4, dated Sep. 20, 2010.
Response to Office Action, European Patent Application No. 05763341.4, dated Sep. 20, 2010, filed Jul. 18, 2011.
International Preliminary Report on Patentability, International Searching Authority, Application No. PCT/US2005/019923, dated May 12, 2006.
Amendment in Response to Notice of Allowance, U.S. Appl. No. 11/136,019, dated Dec. 23, 2011, filed Mar. 23, 2012.
"10-K SEC Filing—iQ 180 Products", *Adaptive Optics Associates* 900 Coles Road Blackwood, NJ 08012-4683, (Dec. 2003).
"Laser Scanning Product Guide", *Adaptive Optics Associates—Industrial Products and Systems* 90 Coles Road Blackwood, NJ 08012, Industrial Holographic and Conventional Laser 1D, Omnidirectional Bar Codes Scanners, (Mar. 2003).
"CCD/CMOS Sensors Spot Niche Application", *PennWell Corporation*, Vision System Design—Imaging and Machine Vision Technology, (2004).
West, Perry C., "High Speed, Real-Time Machine Vision", *Imagenation and Automated Vision Systems, Inc.*, (2001).
Asundi, A. et al., "High-Speed TDI Imaging for Peripheral Inspection", *Proc. SPIE* vol. 2423, Machine Vision Applications in Industrial Inspection III, Frederick Y. Wu; Stephen S. Wilson; Eds., (Mar. 1995), 189-194.
Baillard, C. et al., "Automatic Reconstruction of Piecewise Planar Models from Multiple Views", *CVPR* vol. 02, No. 2, (1999), 2559.
Kim, Zuwhan et al., "Automatic Description of Complex Buildings with Multiple Images", *IEEE* 0-7695-0813-8/00, (2000), 155-162.
Siemens AG, "Simatic Machine Vision", *Simatic VS 100 Series*, www.siemens.com/machine-vision, (Apr. 1, 2003).
Stauffer, Chris et al., "Tracking-Based Automatic Object Recognition", *Artificial Intelligence Laboratory, Massachusetts Institute of Technology*, Cambridge, MA http://www.ai.mit.edu, (2001), pp. 133-134.
Baumberg, A. M. et al., "Learning Flexible Models from Image Sequences", *University of Leeds, School of Computer Studies, Research Report Series, Report 93.36*, (Oct. 1993), pp. 1-13.
Rohr, K. "Incremental Recognition of Pedestrians from Image Sequences", *CVPR93* (1993).
Chang, Dingding et al., "Feature Detection of Moving Images using a Hierarchical Relaxation Method", *IEICE Trans. Inf. & Syst.*, vol. E79-D, (Jul. 7, 1996).
Zarandy, A. et al., "Vision Systems Based on the 128X128 Focal Plane Cellular Visual Microprocessor Chips", *IEEE* (Mar. 2003), III-518-III-521.

"Matsushita LightPix AE10", *NAiS Machine Vision—Matsushita Machine Vision Systems*, (2003).
Corke, Peter I., et al., "Real Time Industrial Machine Vision", *Electrical Engineering Congress* Sydney, Australia, CSIRO Division of Manufacturing Technology, (1994).
Marsh, R et al., "The application of knowledge based vision to closed-loop control of the injection molding process", *SPIE* vol. 3164, Faculty of Engineering University of the West of England United Kingdon, (1997), 605-16.
Zarandy, Akos et al., "Ultra-High Frame Rate Focal Plane Image Sensor and Processor", *IEEE Sensors Journal*, vol. 2, No. 6,(2002).
"CVL Vision Tools Guide", *Cognex MVS-8000 Series*, Chapter 5, Symbol Tool, CVL 5.4, (Dec. 1999).
"Cognex 4000/5000 SMD Placement Guidance Package, User's Manual", *Release 3.8.00, Chapter 15*, 590-6168, (1998).
"Cognex 3000/4000/5000 Image Processing", *Revision 7.4 590-0135 Edge Detection Tool*, (1996).
Denis, Jolivet "LabVIEW and IMAQ Vision Builder Provide Automated Visual Test System", *Semiconductor: IMAQ Advanced Analysis Toolkit*, IMAQ Vision Builder—LabVIEW—National Instruments—XP002356529—URL http://www.ni.com/pdf/csma/us/JNDESWG.pdf, (2001).
"Cellular device processes at ultrafast speeds", *VisionSystems Design*, (Feb. 2003).
Cognex Corporation, "Screen shot of the CheckMate GUI Ver 1.6", (Jan. 2005).
Olympus Industrial, "Design Philosophy", *i-speed*, (2002), 4.
Wright, Anne et al., "Cognachrome Vision System User's Guide", *Newton Research Labs*, Manual Edition 2.0, Documents Software Version 26.0, (Jun. 3, 1996).
Stemmer Imaging GmbH, "Going Multimedia with Common Vision Blox", *Product News*, www.stemmer-imaging.de, (Mar. 3, 2004).
Lavision GmbH, "High Speed CCD/CMOS Camera Systems", *Overview of state-of-the-art High Speed Digital Camera Systems—UltraSpeedStar*, www.lavision.de, (Sep. 24, 2004).
Cordin Company, "Electronic Imaging Systems", *High Speed Imaging Solutions: 200-500 Series Cameras*, (Aug. 4, 2004).
KSV Instruments Ltd., "HiSIS 2002—High Speed Imaging System", www.ksyltd.fi, (Sep. 24, 2004).
PHOTRON USA, "Ultima APX", (Sep. 24, 2004).
PHOTRON USA, "FASTCAM PCI", (Sep. 24, 2004).
PHOTRON USA, "Ultima 512", (Sep. 24, 2004).
PHOTRON USA, "Ultima 1024", (Sep. 24, 2004).
PHOTRON USA, "FASTCAM-X 1280 PCI", (Sep. 24, 2004).
Apple Computer Inc., *Studio Display User's Manual online*, retrieved on Nov. 24, 2010, retrieved from the Internet http://manuals.info.apple.com/en/studioDisplay_15inLCDUserManual.pdf, (1998).
Cognex Corporation, "VisionPro Getting Started", Revision 3.2, Chapter 5, 590-6508, copyright 2003.
Allen-Bradley, "Bulletin 2803 VIM Vision Input Module", Cat. No. 2803-VIM2, Printed USA, (1991. Submitted in 6 parts.).
Allen-Bradley, "Users Manual", *Bulletin 2803 VIM Vision Input Module*, Cat. No. 2803-VIM1, (1987. Submitted in 2 parts).
Allen-Bradley, "Bulletin 5370 CVIM Configurable Vision Input Module", *User Manual Cat. No. 5370-CVIM*, (1995. Submitted in 4 parts.).
Cognex Corporation, "3000/4000/5000 Vision Tools", revision 7.6, 590-0136, Chapter 13, (1996), (Submitted in 3 parts).
Cognex Corporation, "Cognex 3000/4000/5000", *Vision Tools*, Revision 7.6, 590-0136, Chapter 10 Auto-Focus, (1996).
Bauer, Peter "Special Edition Using Adobe Photoshop CS and Illustrator CS", Indianapolis, IN: Que. Published Mar. 2004. Accessed: Safari Tech Books Online. Web. Feb. 4, 2014. p. 283 and Chapters 9 and 28.
US 6,768,414, 07/2004, Francis (withdrawn)

\* cited by examiner

HUMAN-MACHINE-INTERFACE AND METHOD FOR MANIPULATING DATA IN A MACHINE VISION SYSTEM

RELATED APPLICATIONS

This application is a divisional of commonly assigned copending U.S. patent application Ser. No. 11/616,726, filed Dec. 27, 2006, entitled HUMAN-MACHINE-INTERFACE AND METHOD FOR MANIPULATING IN A MACHINE VISION SYSTEM, which is a continuation-in-part of commonly assigned copending U.S. patent application Ser. No. 11/138,025 which was filed, May 26, 2005, by William M. Silver, et al., for a METHOD AND APPARATUS FOR AUTOMATIC VISUAL DETECTION, RECORDING, AND RETRIEVAL OF EVENTS, which is a continuation-in-part of commonly assigned, copending U.S. patent application Ser. No. 11/059,512, which was filed Feb. 16, 2005, by William M. Silver, et al., for a METHOD AND APPARATUS FOR AUTOMATIC VISUAL DETECTION, RECORDING, AND RETRIEVAL OF EVENTS, which is a continuation-in-part of commonly assigned, copending U.S. patent application Ser. No. 10/865,155, which was filed on Jun. 9, 2004, by William M. Silver for a METHOD AND APPARATUS FOR VISUAL DETECTION AND INSPECTION OF OBJECT, the teachings of which are all hereby incorporated by reference.

FIELD OF THE INVENTION

This invention is related to machine vision systems and more particularly to graphical user interfaces employed in the setup and operation of machine vision systems, and the functions carried out by such machine vision systems.

BACKGROUND OF THE INVENTION

Machine vision systems are used for a growing variety of manufacturing and inspection processes in research and industry. A machine vision system enables a user to monitor subject parts and workpieces, either at stationary locations or on moving lines, and to compare acquired images of the subjects to trained patterns, stored in a memory. All machine vision systems employ a camera with an image-acquisition sensor. The sensor may be based upon a charge-coupled device (CCD) or CMOS element that breaks down an optical image into a matrix of pixels, each pixel being represented by a grayscale or color value within a given range (0-255, for example). Machine vision is used to accomplish a number of different industrial, commercial and governmental tasks. For example, machine vision can be employed to decode symbology, such as barcodes and two-dimensional data matrices. Machine vision is also commonly employed to scan for defects in a part or surface. Sophisticated search and analysis software tools, in combination with powerful processors, are provided for many of these qualitative analysis functions. More basic implementations of machine vision systems have recently become available to replace older-style opto-electric detectors (sometimes termed "electric-eyes") that have been used for many years on production lines to sense for the gross presence or absence of an item on the line, or a major defect (e.g. a missing component) in an item. Where a gross defect or missing article is detected, the detector signals an alarm and/or stops the conveyor line. The detector may operate based upon a trigger signal, provided by another opto-electric presence sensor, or based upon the timing of the moving line, which is signaled by (for example) an encoder. The detector may also cause a reject device (a "part kicker") to eject a given article from the line.

An implementation of such a detector, termed a vision detector is described in commonly assigned, copending U.S. Published Patent Application No. US200550275831A1 (U.S. application Ser. No. 10/865,155), entitled METHOD AND APPARATUS FOR VISUAL DETECTION AND INSPECTION OF OBJECTS, by William M. Silver, the teachings of which are expressly incorporated by reference (and other related applications thereto). The vision detector employs a low-cost, high-speed image element to capture and analyze a sequence of images at higher speeds (but typically at lower resolution) than prior art vision systems. An image in such a sequence that is captured and analyzed is called a frame. The rate at which frames are captured and analyzed, called the frame rate, is sufficiently high that a moving object is seen in multiple consecutive frames as it passes through the field of view (FOV). Since the objects moves somewhat between successive frames, it is located in multiple positions in the FOV, and therefore it is seen from multiple viewing perspectives and positions relative to the illumination. Using a principle termed dynamic image analysis, viewed objects are inspected by capturing and analyzing multiple frames for which the object is located in the field of view, and basing a result on a combination of evidence obtained from each of those frames. This method provides significant advantages over prior art machine vision systems that make decisions based on a single frame. The incorporated vision detector enables visual event detection, in which events that may occur in the field of view are identified by the system. An event can be an object passing through the field of view, and by using visual event detection the object can be detected without the need for a trigger signal.

In order to obtain images from multiple perspectives, it is desirable that an object to be detected or inspected moves no more than a small fraction of the field of view between successive frames, often no more than a few pixels. For a vision detector, it is generally desirable that the object motion be no more than about one-quarter of the FOV per frame, and in typical embodiments no more than 5% or less of the FOV. It is desirable that this be achieved not by slowing down a manufacturing process but by providing a sufficiently high frame rate. In an example system the frame rate is at least 200 frames/second, and in another example the frame rate is at least 40 times the average rate at which objects are presented to the vision detector. An exemplary vision detector system capture and analyze up to 500 frames/second. This system makes use of an ultra-sensitive imager that has far fewer pixels than prior art vision systems. The high sensitivity allows very short shutter times using very inexpensive LED illumination, which in combination with the relatively small number of pixels allows very short image capture times. The imager is interfaced to a digital signal processor (DSP) that can receive and store pixel data simultaneously with analysis operations. Using a suitable software for the DSP, the time to analyze each frame generally can be kept to within the time needed to capture the next frame. The capture and analysis methods and apparatus combine to provide the desired high frame rate. By carefully matching the capabilities of the imager, DSP, and illumination with the objectives of the invention, the exemplary system can be significantly less expensive than prior art machine vision systems.

The method of visual event detection involves capturing a sequence of frames and analyzing each frame to determine evidence that an event is occurring or has occurred. When visual event detection is used to detect objects without the need for a trigger signal, the analysis would determine evidence that an object is located in the field of view.

In an exemplary method, the evidence is in the form of a value, called an object detection weight, that indicates a level of confidence that an object is located in the field of view. The value may be a simple yes/no choice that indicates high or low confidence, a number that indicates a range of levels of confidence, or any item of information that conveys evidence. One example of such a number is a so-called fuzzy logic value, further described therein. Note that no machine can make a perfect decision from an image, and so will instead make judgments based on imperfect evidence.

When performing object detection, a test is performed for each frame to decide whether the evidence is sufficient that an object is located in the field of view. If a simple yes/no value is used, the evidence may be considered sufficient if the value is "yes." If a number is used, sufficiency may be determined by comparing the number to a threshold. Frames where the evidence is sufficient are called active frames. Note that what constitutes sufficient evidence is ultimately defined by a human user who configures the vision detector based on an understanding of the specific application at hand. The vision detector automatically applies that definition in making its decisions.

When performing object detection, each object passing through the field of view will produce multiple active frames due to the high frame rate of the vision detector. These frames may not be strictly consecutive, however, because as the object passes through the field of view there may be some viewing perspectives, or other conditions, for which the evidence that the object is located in the field of view is not sufficient. Therefore it is desirable that detection of an object begins when an active frame is found, but does not end until a number of consecutive inactive frames are found. This number can be chosen as appropriate by a user.

Once a set of active frames has been found that may correspond to an object passing through the field of view, the system typically performs a further analysis to determine whether an object has indeed been detected. This further analysis may consider some statistics of the active frames, including the number of active frames, the sum of the object detection weights, the average object detection weight, and the like.

The above-described method of dynamic image analysis involves capturing and analyzing multiple frames to inspect an object, where "inspect" is defined as determining some information about the status of the object. In one example, the status of an object includes whether or not the object satisfies inspection criteria chosen as appropriate by a user.

Dynamic image analysis can be combined with visual event detection, so that the active frames chosen by the visual event detection method are the ones used by the dynamic image analysis method to inspect the object. In an exemplary implementation, the frames used by dynamic image analysis can be captured in response to a trigger signal.

Each such frame is analyzed to determine evidence that the object satisfies the inspection criteria. In one exemplary method, the evidence is in the form of a value, called an object pass score, which indicates a level of confidence that the object satisfies the inspection criteria. As with object detection weights, the value may be a simple yes/no choice that indicates high or low confidence, a number, such as a fuzzy logic value, that indicates a range of levels of confidence, or any item of information that conveys evidence.

The status of the object may be determined from statistics of the object pass scores, such as an average or percentile of the object pass scores. The status may also be determined by weighted statistics, such as a weighted average or weighted percentile, using the object detection weights. Weighted statistics effectively weigh evidence more heavily from frames wherein the confidence is higher that the object is actually located in the field of view for that frame.

Evidence for object detection and inspection is obtained by examining a frame for information about one or more visible features of the object. A visible feature is a portion of the object wherein the amount, pattern, or other characteristic of emitted light conveys information about the presence, identity, or status of the object. Light can be emitted by any process or combination of processes, including but not limited to reflection, transmission, or refraction of a source external or internal to the object, or directly from a source internal to the object.

One aspect of the above-described vision detector is a method for obtaining evidence, including object detection weights and object pass scores, by image analysis operations on one or more regions of interest in each frame for which the evidence is needed. In an example of this method, the image analysis operation computes a measurement based on the pixel values in the region of interest, where the measurement is responsive to some appropriate characteristic of a visible feature of the object. The measurement is converted to a logic value by a threshold operation, and the logic values obtained from the regions of interest are combined to produce the evidence for the frame. The logic values can be binary or fuzzy logic values, with the thresholds and logical combination being binary or fuzzy as appropriate.

For visual event detection, evidence that an object is located in the field of view is effectively defined by the regions of interest, measurements, thresholds, logical combinations, and other parameters, which are collectively called the configuration of the vision detector, and are chosen by a user as appropriate for a given application of the invention. Similarly, the configuration of the vision detector defines what constitutes sufficient evidence. For dynamic image analysis, evidence that an object satisfies the inspection criteria is also effectively defined by the configuration of the vision detector.

In general, the vision detector is optimally adapted to perform the function of conventional opto-electric detectors. While most of these functions could be performed by a standard machine vision system, the vision detector is less expensive and easier to set up than prior art machine vision systems, and operate at much higher speeds. These systems and methods furthermore make use of multiple perspectives of moving objects, operate without triggers, provide appropriately synchronized output signals, and provide other significant and useful capabilities that will be apparent to those skilled in the art.

The above-described vision detectors, as well as other machine vision applications, such as readers of symbology (barcodes, etc.), inspection tools and facial identification systems, are generally set up, monitored, adjusted and "debugged" using Human-machine interfaces (HMIs) that employ a graphical user interface (GUI). Once set up, the vision detector and a variety of other stand-alone machine vision systems can often be disconnected from the HMI. Nevertheless, the HMI performs a critical role in the configuration of the system and subsequent analysis of system performance and ability to detect objects and their underlying features. The HMI also allows for monitoring and fault analysis in implementations wherein the detector or other vision system records events and allows playback of the recordings. For these and other purposes, a user-friendly, fully featured and versatile HMI is highly desirable.

SUMMARY OF THE INVENTION

This invention overcomes the disadvantages of prior art systems and methods by providing a Graphical User Interface (GUI) that operates on a Human-Machine Interface (HMI), such as a PC, in connection with a machine vision detector or other machine vision system, which provides a highly intuitive and industrial machine-like appearance and layout. The GUI includes a centralized image frame window surrounded by panes having buttons and specific interface components that the user employs in each step of a machine vision system set up and run a new machine vision job. One pane allows the user to view and manipulate a recorded filmstrip of image thumbnails taken in a sequence, and provides the filmstrip with specialized highlighting (colors or patterns) that indicate useful information about the underlying images. The filmstrip is provided with controls to record, playback and scroll through thumbnails that are simulative of consumer video recording appliances to provide a more-intuitive interface. The filmstrip controls include a selector that allows the user to switch between image modes.

The vision system is set up and run using a sequential series of buttons or switches that are activated by the user in a predefined order to perform each of the steps needed (typically) to create a new machine vision job including: connect to a vision system; train the system to recognize or detect objects/parts; configure the logic that is used to handle recognition/detection signals; set up system outputs from the system based upon the logical results; and finally, run and test the programmed system in real time. The programming of logic is performed using a programming window that includes a ladder logic arrangement. Three default rungs are provided. The default rungs include contacts that provide, respectively, an ANDing of all recognition/detection results, an ORing of these results, and a general object/part detection signal. The user can define additional rungs. The contacts for each rung can be based upon output coils of previous rungs or upon recognition/detection results. The contacts can be clicked upon the display properties and allow those properties to be changed. A thumbnail window is provided on the programming window in which an image from a filmstrip is displayed, focusing upon the locations of the image (and underlying viewed object/part) in which the selected contact element is provided.

BRIEF DESCRIPTION OF THE DRAWINGS

The invention description below refers to the accompanying drawings, of which.

DETAILED DESCRIPTION

A. Implementation of an Exemplary Machine Vision Detector

Figure 1:
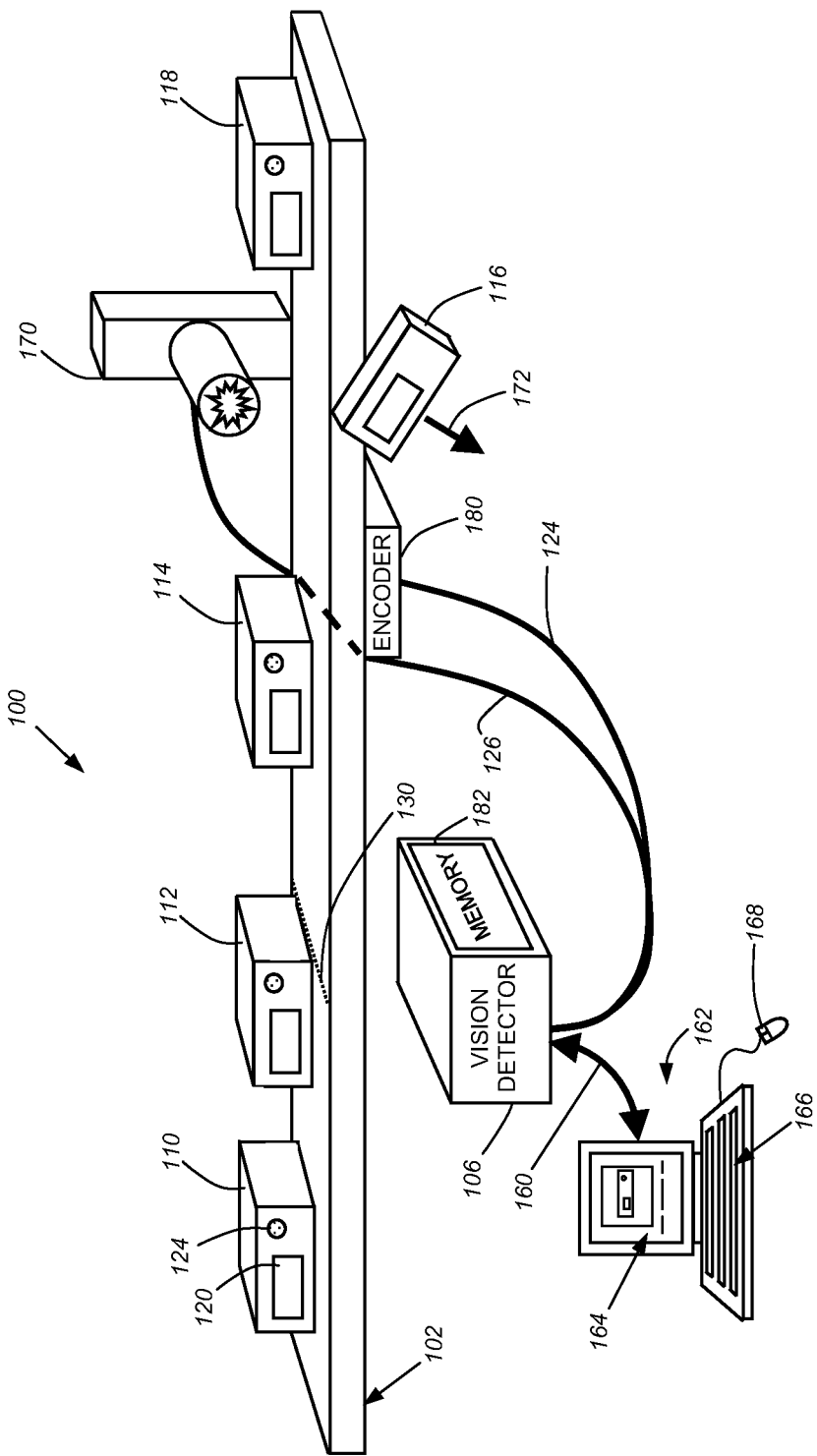
FIG. 1 is a diagram of an exemplary implementation of a machine vision detector system to which the teachings of this invention are applicable.

FIG. 1 shows an example of an exemplary machine vision system to which the teachings of this invention may be applied. The system is a vision detector system 100 as described above, and as set forth generally in the above-incorporated, U.S. Published Patent Application No. US200550275831A1, entitled METHOD AND APPARATUS FOR VISUAL DETECTION AND INSPECTION OF OBJECTS, by William M. Silver. It should be noted that, while this Description references a vision detector as the exemplary operative machine vision implementation, the teachings of an HMI described and claimed herein are expressly applicable to a wide range of vision systems. Thus, the HMI functions and layout described herein should be taken as broadly applicable to any system requiring setup, monitoring, feedback of inspection data and the like. Such systems include, but are not limited to, the exemplary vision detector, a more complete machine vision inspection system, identification systems, and symbology readers.

As shown, the system 100 is inspecting objects 110 on a production line. A conveyor 102 transports the objects 110 to cause relative movement between the objects 110 and the field of view of vision detector 106. Objects 110, 112, 114, 116, and 118 move left to right on the conveyor 100. Each object is expected to contain certain features—for example, a label 120 and a hole 124. Objects incorrectly manufactured may be missing one or more features, or may have unintended features; for example, object 116 is missing the hole 124. On many production lines motion of the conveyer is tracked by a shaft encoder 180. The vision detector 106 detects the presence of an object by visual appearance and inspects it based on appropriate inspection criteria. If an object is defective, the vision detector 106 sends a signal over link 126 to a reject actuator 170 to remove (arrow 172) the object 116 from the conveyer stream as shown. The encoder 180 sends signal over link 124 to the vision detector 106, which uses it to insure proper delay of signal (on link 126) from the encoder count where the object crosses some fixed, imaginary reference point 130, called the mark point. If an encoder is not used, the delay can be based on time instead.

In an alternate implementation, the vision detector sends signals to a programmable logic controller (PLC) for various purposes, which may include controlling a reject actuator (170).

Figure 2:
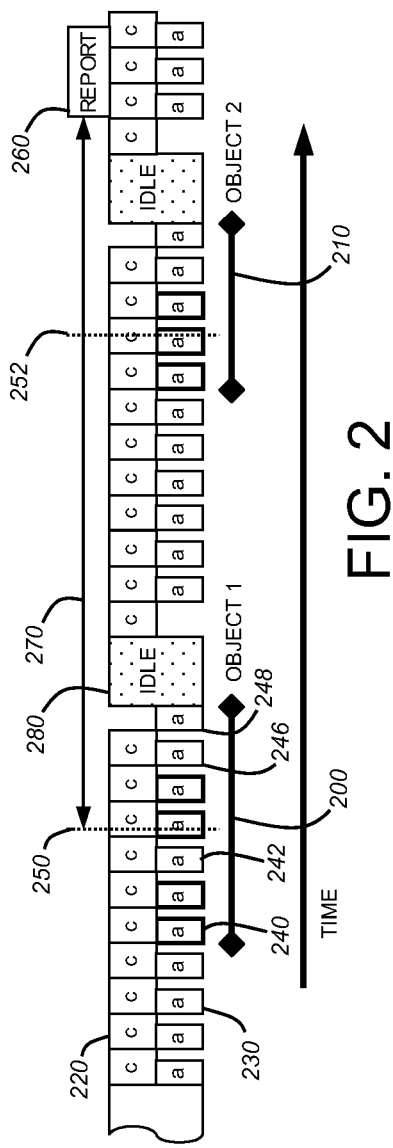
FIG. 2 is a timing diagram that illustrates a typical operating cycle for the exemplary vision detector system of FIG. 1 using visual event detection.

FIG. 2 shows a timeline that illustrates a typical operating cycle for a vision detector in visual event detection mode. Boxes labeled "c", such as box 220, represent image capture. Boxes labeled "a", such as box 230, represent image analysis. It is desirable that capture "c" of the next image be overlapped with analysis "a" of the current image, so that (for example) analysis step 230 analyzes the image captured in capture step 220. In this timeline, analysis is shown as taking less time than capture, but in general, analysis will be shorter or longer than capture depending on the application details.

If capture and analysis are overlapped, the rate at which a vision detector can capture and analyze images is determined by the longer of the capture time and the analysis time. This is the "frame rate".

The vision detector of this example allows objects to be detected reliably without a trigger signal, such as that provided by a photodetector. Referring to FIG. 1, there is no trigger signal to indicate the presence of an object, and in FIG. 2 there is no corresponding trigger step.

Referring again to FIG. 2, a portion 200 of the timeline corresponds to the inspection of a first object, and contains the capture and analysis of seven frames. A second portion 210 corresponds to the inspection of a second object, and contains five frames.

Each analysis step first considers the evidence that an object is present. Frames where the evidence is sufficient are called active. Analysis steps for active frames are shown with a thick border, for example analysis step 240. In an illustrative embodiment, inspection of an object begins when an active frame is found, and ends when some number of consecutive inactive frames are found. In the example of FIG. 2, inspection of the first object begins with the first active frame corresponding to analysis step 240, and ends with two consecutive inactive frames, corresponding to analysis steps 246 and 248. Note that for the first object, a single inactive frame corresponding to analysis step 242 is not sufficient to terminate the inspection.

At the time that inspection of an object is complete, for example at the end of the analysis steps, decisions are made on the status of the object based on the evidence obtained from the active frames. In an illustrative embodiment, if an insufficient number of active frames were found then there is considered to be insufficient evidence that an object was actually present, and so operation continues as if no active frames were found. Otherwise an object is judged to have been detected, and evidence from the active frames is judged in order to determine its status, for example pass or fail. Once an object has been detected and a judgment made, a report may be made to appropriate automation equipment, such as a PLC, using signals well-known in the art. In such a case a report step would appear in the timeline. The example of FIG. 2 corresponds instead to a setup such as shown in FIG. 1, where the vision detector is used to control a downstream reject actuator 170. By considering the position of the object in the active frames as it passes through the field of view, the vision detector estimates the mark time 250 and 252 at which the object crosses the mark point 130. Note that in cases where an encoder 180 is used, the mark time is actually an encoder count; the reader will understand that time and count can be used interchangeably. A report 260, consisting of a pulse of appropriate duration to the reject actuator 170, is issued after a precise delay 270 in time or encoder count from the mark time 250.

Note that the report 260 may be delayed well beyond the inspection of subsequent objects such as 210. The vision detector uses well-known first-in first-out (FIFO) buffer methods to hold the reports until the appropriate time.

Once inspection of an object is complete, the vision detector may enter an idle step 280. Such a step is optional, but may be desirable for several reasons. If the maximum object rate is known, there is no need to be looking for an object until just before a new one is due. An idle step will eliminate the chance of false object detection at times when an object couldn't arrive, and will extend the lifetime of the illumination system because the lights can be kept off during the idle step (280).

Figure 3:
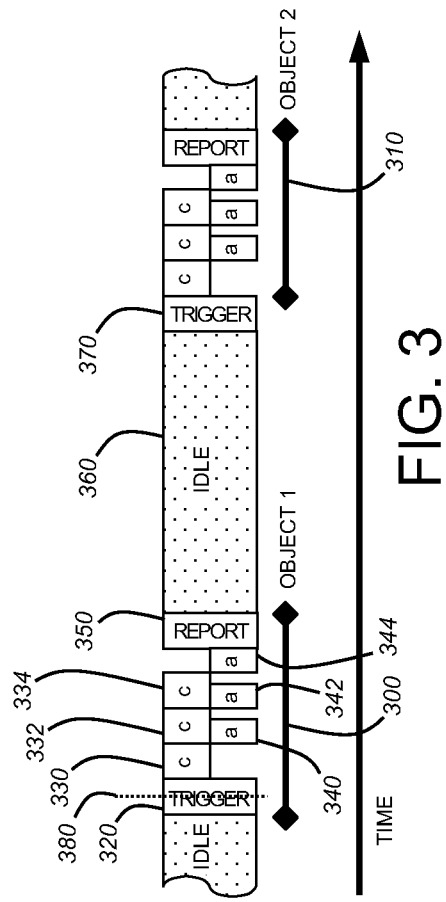
FIG. 3 is a timing diagram that illustrates a typical operating cycle for the exemplary vision detector system of FIG. 1 using a trigger signal.

FIG. 3 shows a timeline that illustrates a typical operating cycle for a vision detector in external trigger mode. A trigger step 320 begins inspection of a first object 300. A sequence of image capture steps 330, 332, and 334, and corresponding analysis steps 340, 342, and 344 are used for dynamic image analysis. As in visual event detection mode, it is desirable that the frame rate be sufficiently high that the object moves a small fraction of the field of view between successive frames, often no more than a few pixels per frame. After a fixed number of frames, the number being chosen based on application details, the evidence obtained from analysis of the frames is used to make a final judgment on the status of the object, which in one embodiment is provided to automation equipment in a report step 350. Following the report step, an idle step 360 is entered until the next trigger step 370 that begins inspection of a second object 310.

In another embodiment, the report step is delayed in a manner equivalent to that shown in FIG. 2. In this example, the mark time 380 is the time (or encoder count) corresponding to the trigger step 320.

Referring again to FIG. 1, the vision detector 106 is coupled via a link 160 to a human-machine interface (HMI) in accordance with the teachings of this invention, which, in this example is provided on a laptop or desktop personal computer (PC) 162, with a display 164. The display 164 is driven by hardware and software within the PC 162, using circuits, applications and procedures known to those of ordinary skill. The display 164 provides a visual representation of a graphical user interface (GUI) in accordance with this invention. The GUI can be manipulated by a keyboard 166, mouse or other device, such as a touchscreen. The HMI and GUI are employed to monitor, configure and test the system as described in detail below.

B. Exemplary Vision Detection Software

Figure 4:
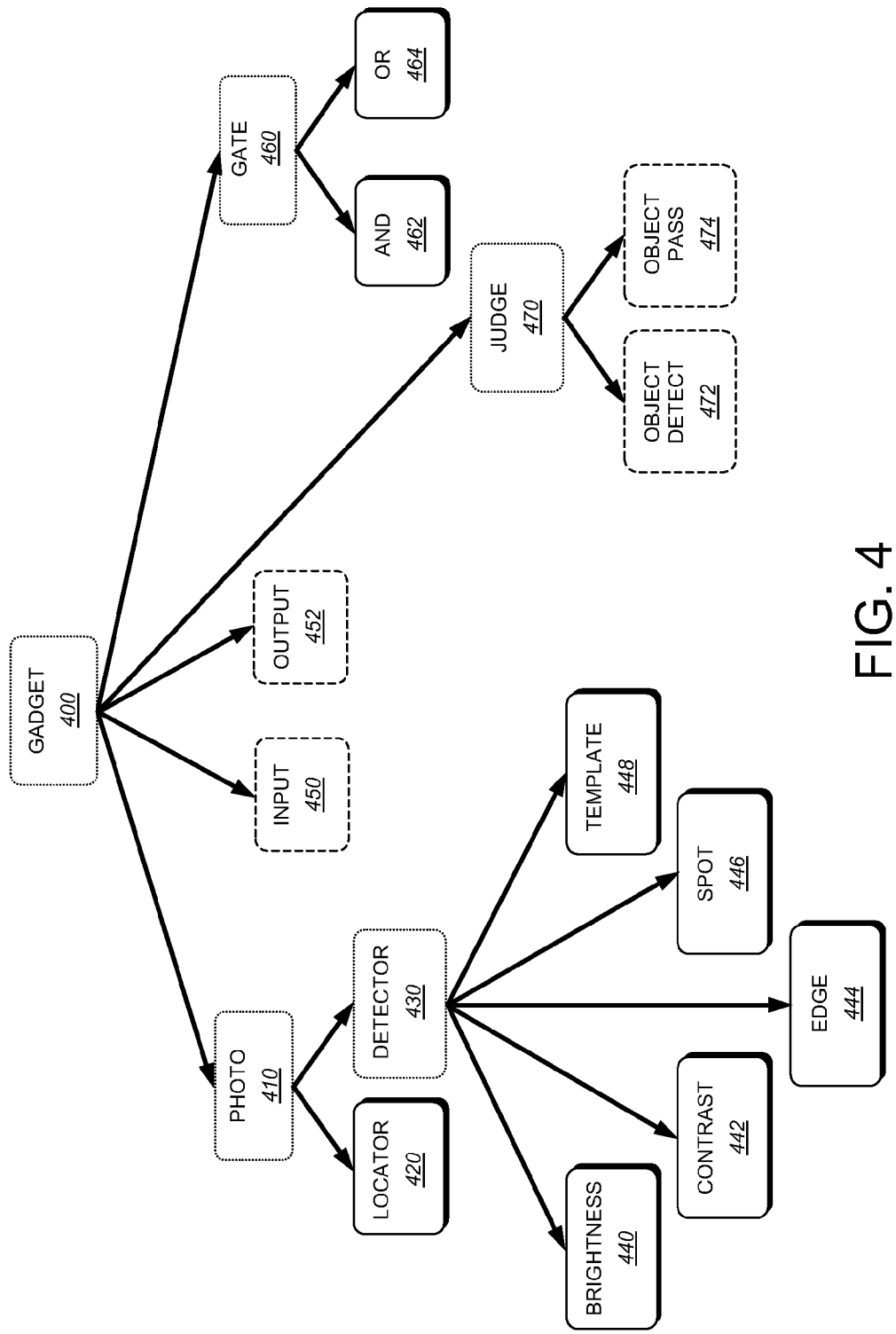
FIG. 4 is a diagram showing the organization of software elements used to analyze image frames, make judgments, sense inputs and control output signals in conjunction with the exemplary vision detector system of FIG. 1.

FIGS. 4-7 are shown by way of background to illustrate software and a basic HMI graphical user interface (GUI) elements that may be employed in conjunction with the exemplary vision detection system 100. These and other related elements are described in commonly assigned, co-pending U.S. Published Patent Application No. US20050276459A1, entitled Method and apparatus for configuring and testing a machine vision detector, by Andrew Eames, et al., the teachings of which are expressly incorporated herein by reference. FIG. 4 particularly shows an exemplary organization of a set of software elements (e.g., program instructions of a computer-readable medium) used by the exemplary system 100 to analyze acquired image frames, make judgments, sense inputs, and control output signals. The elements may be implemented using a class hierarchy in a conventional object-oriented programming language such as C++, so that each of the elements corresponds to a class. However, any acceptable programming technique and/or language can be used to carry out the processes described herein.

As illustrated, classes with a dotted border, such as Gadget class 400, are abstract base classes that do not exist by themselves but are used to build concrete derived classes such as Locator class 420. Classes with a solid border represent dynamic objects that can be created and destroyed as needed by the user in setting up an application, using an HMI in accordance with this invention. Classes with a dashed border, such as Input class 450, represent static objects associated with specific hardware or software resources. Static objects always exist and cannot be created or destroyed by the user.

Figure 9:
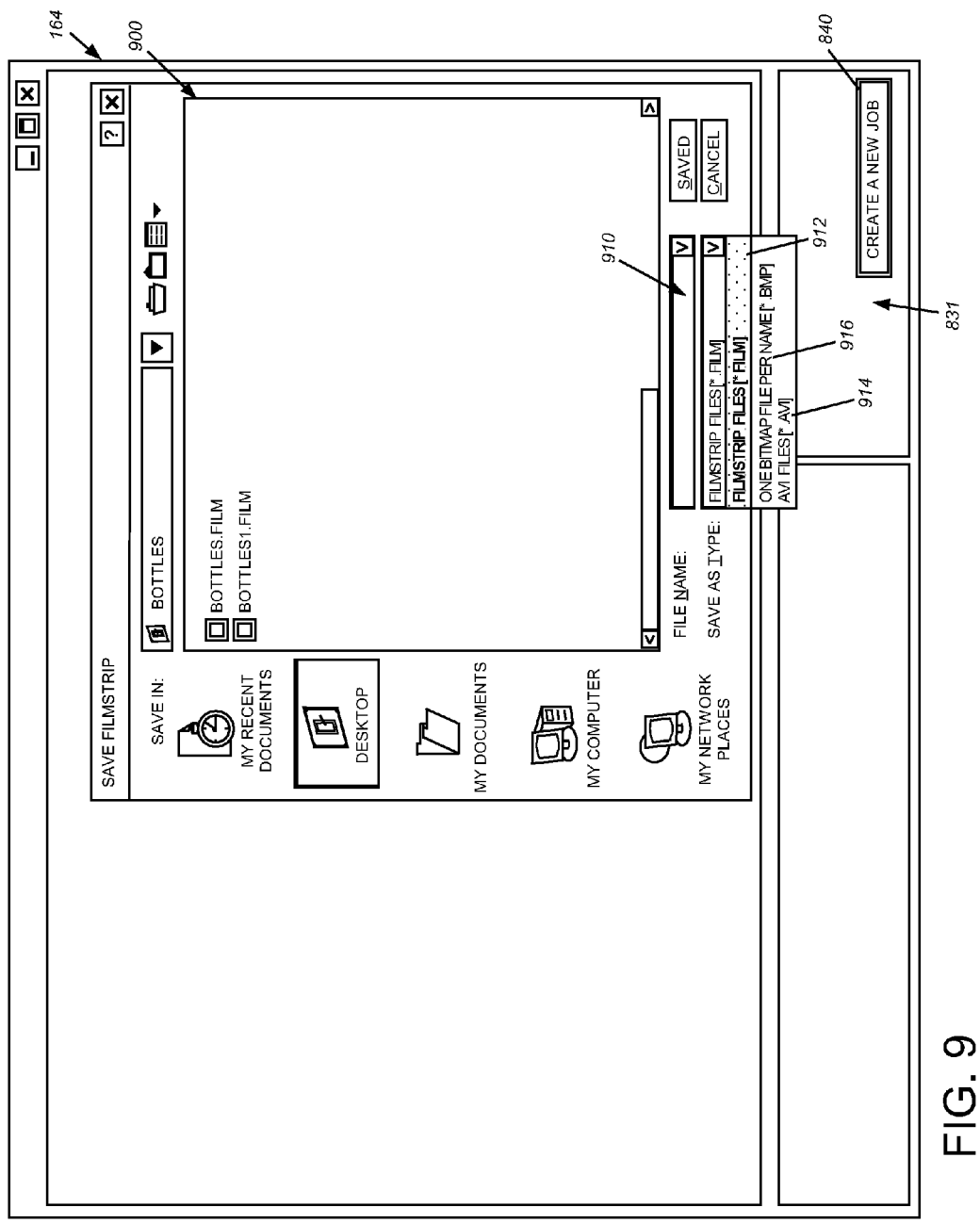
FIG. 9 is a diagram of a save-filmstrip window selected from the GUI display of FIG. 8.

All classes are derived from Gadget class 400, and so all objects that are instances of the classes shown in FIG. 9 are a kind of Gadget. In this example, every Gadget:
1. has a name that can be chosen by the user;
2. has a logic output (a fuzzy logic value) that can be used as a logic input by other gadgets to make judgments and control output signals;
3. has a set of parameters than can be configured by a user to specify its operation;
4. has a parameter that can be used to invert the logic output (i.e. fuzzy NOT); and
5. can be run, which causes its logic output to be updated based on its parameters, logic inputs if any, and for certain Gadgets the contents of the current frame, and which may also cause side-effects such as the setting of an output signal.

The act of analyzing a frame consists of running each Gadget once, in an order determined to guarantee that all logic inputs to a Gadget have been updated before the Gadget is run. In some implementations, a Gadget is not run during a frame where its logic output is not needed.

The Photo class 410 is the base class for all Gadgets whose logic output depends on the contents of the current frame. These are the classes that actually do the image analysis. Every Photo measures some characteristic of a region of interest (ROI) of the current frame. The ROI corresponds to a visible feature on the object to be inspected. This measurement is called the Photo's analog output. The Photo's logic output is computed from the analog output by means of a fuzzy threshold, called the sensitivity threshold, which is among its set of parameters that can be configured by a user. The logic output of a Photo can be used to provide evidence to be used in making judgments.

The exemplary Detector class 430 is the base class for Photos whose primary purpose is to make measurements in an ROI and provide evidence to be used in making judgments about an object or feature thereon. In this example, all Detector ROIs are defined by circles. A circular ROI simplifies the implementation because there is no need to deal with rotation, and having only one ROI shape simplifies what the user has to learn. Detector parameters include the position and diameter of the ROI.

A Brightness Detector 440 measures a weighted average or percentile brightness in the ROI. A Contrast Detector 442 measures contrast in the ROI. An Edge Detector 444 measures the extent to which the ROI looks like an edge in a specific direction. A Spot Detector 446 measures the extent to which the ROI looks like a round feature such as a hole. A Template Detector 448 measures the extent to which the ROI looks like a pre-trained pattern selected by a user. The operation of the Detectors is further described below.

The Locator class 420 represents Photos that have two primary purposes. The first is to produce a logic output that can provide evidence for making judgments, and in this they can be used like any Detector. The second is to determine the location of an object in the field of view of a vision detector, so that the position of the ROI of other Photos can be moved so as to track the position of the object. Any Locator can be used for either or both purposes.

In this example, a Locator searches a one-dimensional range in a frame for an edge. The search direction is normal (perpendicular) to the edge, and is among the parameters to be configured by the user. The analog output of a Locator is similar to that for an Edge Detector. Locators are further described below.

The Input class 450 represents input signals to the vision detector, such as an external trigger. The Output class 452 represents output signals from the vision detector, such as might be used to control a reject actuator 170 (via link 126 in FIG. 1). There is one static instance of the Input class for each physical input, such as exemplary input signal (such as the encoder signal on link 124 in FIG. 1) and one static instance of the Output class for each physical output.

The Gate base class 460 implements fuzzy logic decision-making Each Gate has one or more logic inputs than can be connected to the logic outputs of other Gadgets. Each logic input can be inverted (fuzzy NOT) by means of a parameter that a user can configure. An AND Gate 462 implements a fuzzy AND operation, and an OR Gate 464 implements a fuzzy OR operation.

The Judge class 470 is the base class for two static objects, the ObjectDetect Judge 472 and the ObjectPass Judge 474. Judges implement dynamic image analysis by weighing evidence over successive frames to make the primary decisions. Each Judge has a logic input to which a user connects the logic output of a Photo or, more typically, a Gate that provides a logical combination of Gadgets, usually Photos and other Gates.

The ObjectDetect Judge 472 decides if an object has been detected, and the ObjectPass Judge 474 decides if it passes inspection. The logic input to the ObjectDetect Judge provides the object detection weight for each frame, and the logic input to the ObjectPass Judge provides the object pass score for each frame.

The logic output of the ObjectDetect Judge provides a pulse that indicates when a judgment has been made. In one mode of operation, called "output when processing", the leading edge of the pulse occurs when the inspection of an object begins, for example at the end of analysis step 240 in FIG. 2, and the trailing edge occurs when the inspection of an object is complete, for example at the end of analysis step 248. In another mode, called "output when done", the leading edge of the pulse occurs when the inspection of an object is complete, for example at the end of analysis step 248 in FIG. 2, and the trailing edge occurs some time after that, for example at the end of idle step 280.

The logic output of the ObjectPass Judge provides a level that indicates whether the most-recently inspected object passed. The level changes state when the inspection of an object is complete, for example at the end of analysis step 248.

Figure 5:
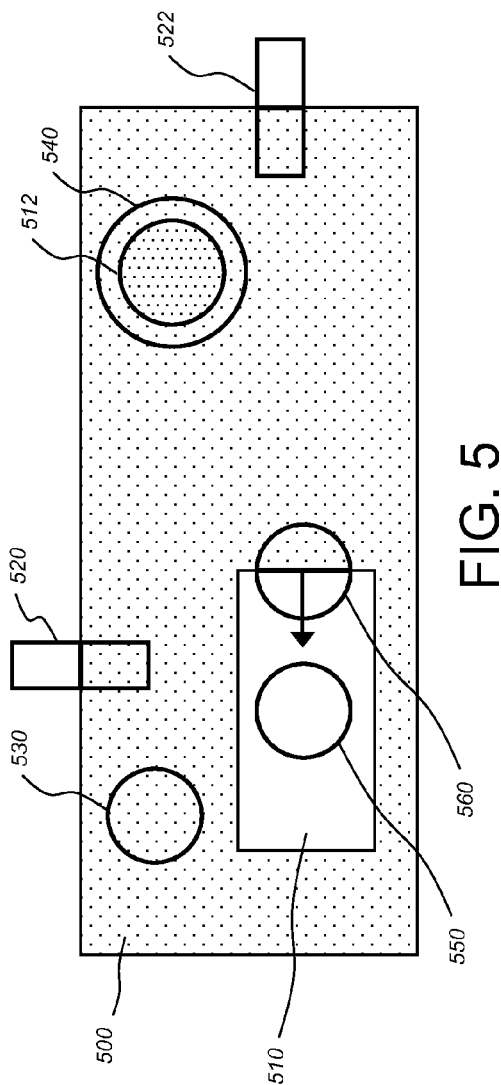
FIG. 5 is a diagram of an exemplary HMI display image view used to configure the exemplary machine vision detector system of FIG. 1.

FIG. 5 shows an example of how Photos can be used to inspect an object. It illustrates an image 500 of an object 110 (FIG. 1), containing the above-described label feature 120 and hole feature 124 as respective image elements 510 and 512. The image also includes superimposed graphics representing the Photos as they would be displayed on an HMI GUI for a user to view and manipulate. The display of an image and superimposed graphics on the GUI is called an image view.

The exemplary object, represented by the image 500 of the object in this example contains six visible features to be inspected, corresponding to the two Locators and four Detectors now further described. One Locator 520 is used to detect and locate the top edge of the object, and another Locator 522 is used to detect and locate the right edge.

A Brightness Detector 530 is used to help detect the presence of the object. In this example the background is brighter than the object, and the sensitivity threshold is set to distinguish the two brightness levels, with the logic output inverted to detect the darker object and not the brighter background. Together, the Locators 520 and 522, and the Brightness Detector 530, provide the evidence needed to judge that an object has been detected, as further described below.

A Contrast Detector 540 is used to detect the presence of the hole 512. When the hole 512 is absent the contrast would be very low, and when present, the contrast would be much higher. A Spot Detector could also be used.

An Edge Detector 560 is used to detect the presence and position of the label 510. If the label is absent, mispositioned horizontally, or significantly rotated, the analog output of the Edge Detector would be very low.

A Brightness Detector 550 is used to verify that the correct label has been applied. In this example, the correct label is white and incorrect labels are darker colors.

As the object moves from left to right through the field of view of the vision detector, Locator 522 tracks the right edge of the object and repositions Brightness Detector 530, Contrast Detector 540, Brightness Detector 550, and Edge Detector 560 to be at the correct side-to-side (horizontal) position relative to the object. Locator 520 corrects for any variation in the vertical position of the object in the field of view, repositioning the detectors based on the location of the top edge of the object. In general Locators can be oriented in any direction.

A user can manipulate Photos in an image view by using well-known HMI techniques. For example, a Photo can be selected by clicking with a mouse, and its ROI can be moved, resized, and rotated by dragging.

Figure 6:
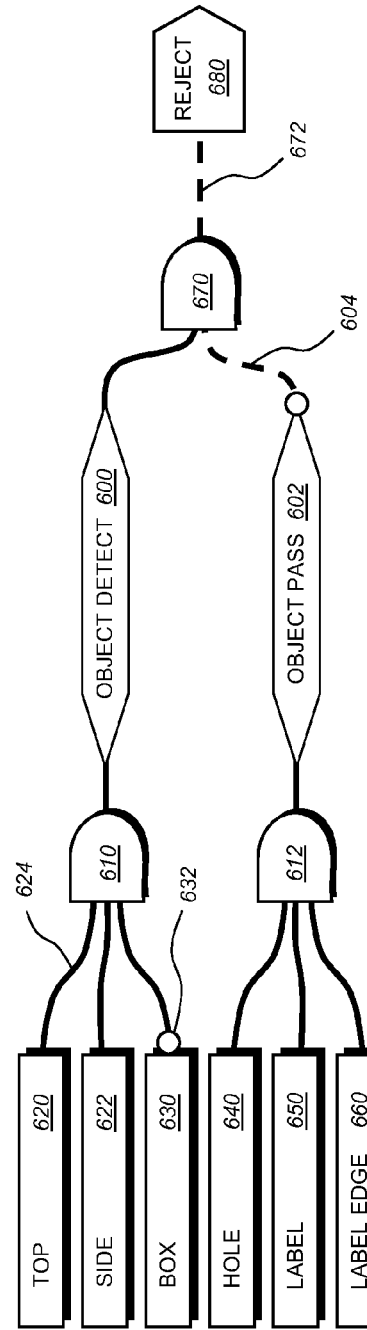
FIG. 6 is a diagram of an exemplary HMI display ladder logic view used to configure the exemplary machine vision detector system of FIG. 1.

FIG. 6 shows a logic view containing a wiring diagram (also termed "ladder logic") corresponding to the exemplary setup of FIG. 5 and described in the above-incorporated Method and apparatus for configuring and testing a machine vision detector. The wiring diagram shows all Gadgets being used to inspect objects and interface to automation equipment, and the connections between logic inputs and outputs of the Gadgets. A wiring diagram is displayed on the HMI GUI at selected times for a user to view and manipulate. A display of gadgets and their logic interconnections on an HMI is called a logic view.

Referring further to the wiring diagram of FIG. 6, a Locator 620 named "Top", corresponding to Locator 520 in the image view of FIG. 5, is connected to AND Gate 610 by wire 624. Similarly, "Side" Locator 622, corresponding to Locator 522, and "Box" Detector 630, corresponding to Brightness Detector 530, are also wired to the AND Gate 610. The logic output of "Box" Detector 630 is inverted, as shown by the small bubble 632, and as described above to detect the darker object against a lighter background.

The logic output of AND Gate 610 represents the level of confidence that the top edge of the object has been detected, the right edge of the object has been detected, and the background has not been detected. When all three conditions are true, confidence is high that the object itself has been detected. The logic output of AND Gate 610 is wired to the ObjectDetect Judge 600 to be used as the object detection weight for each frame.

Since the logic input to the ObjectDetect Judge 600 in this case depends on the current frame, the vision detector is operating in visual event detection mode. To operate in external trigger mode, an Input Gadget would be wired to Object-Detect. To operate in continuous analysis mode, nothing would be wired to ObjectDetect.

The choice of Gadgets to wire to ObjectDetect is made by a user based on knowledge of the application. In the example of FIGS. 5 and 6, a user may have determined that detecting just the top and right edges was not sufficient to insure that an object is present. Note that Locator 522 might respond to the label's left edge just as strongly as the object's right edge, and perhaps at this point in the production cycle Locator 520 might occasionally find some other edge in the background. By adding Detector 530, and requiring all three conditions by means of AND Gate 610, object detection is made reliable.

In the wiring diagram, Contrast Detector "Hole" 640 corresponding to Contrast Detector 540, Brightness Detector "Label" 650, corresponding to Brightness Detector 550, and Edge Detector "LabelEdge" 660, corresponding to Edge Detector 560, are wired to AND Gate 612. The logic output of AND Gate 612 represents the level of confidence that all three image features have been detected, and is wired to ObjectPass Judge 602 to provide the object pass score for each frame.

The logic output of ObjectDetect Judge 600 is wired to AND Gate 670. The logic output of ObjectPass Judge 602 is inverted and also wired to AND Gate 670. The ObjectDetect Judge is set to "output when done" mode, so a pulse appears on the logic output of ObjectDetect Judge 600 after an object has been detected and inspection is complete. Since the logic output of ObjectPass 602 has been inverted, this pulse will appear on the logic output of AND Gate 670 only if the object has not passed inspection. The logic output of AND Gate 670 is wired to an Output gadget 680, named "Reject", which controls an output signal from the vision detector than can be connected directly to a reject actuator 170 (FIG. 1). The Output Gadget 680 is configured by a user to perform the appropriate delay needed by the downstream reject actuator to ensure that the rejected object has moved downstream to a position at which the actuator is located from the detection position.

A user can manipulate Gadgets in a logic view by using well-known HMI techniques. For example, a Gadget can be selected by clicking with a mouse, its position can be moved by dragging, and wires can be created by a drag-drop operation.

To aid the user's understanding of the operation of the vision detector, Gadgets and/or wires can change their visual appearance to indicate fuzzy logic values. For example, Gadgets and/or wires can be displayed red when the logic value is below 0.5, and green otherwise. In FIG. 6, wires 604 and 672 are drawn with dashed lines to indicate a logic value below 0.5, and other wires, for example wire 624, are drawn solid to indicate logic values equal to or greater than 0.5.

One skilled in the art will recognize that a wide variety of objects can be detected and inspected by suitable choice, configuration, and wiring of Gadgets. One skilled in the art will also recognize that the Gadget class hierarchy is only one of many software techniques that could be used in this example.

C. Configuration and Testing of an Exemplary Vision Detection Software

An example of the configuration of a vision detector in accordance with FIG. 1 is now described. To configure this vision detection system 100 to inspect objects, the set of objects 110, 112, 114, 116, and 118 are representative of the objects to be inspected. The defective object 116 is desirably included to show the system examples of flaws to be detected.

The vision detector 400 captures a sequence of images of its field of view. The system's imager captures images, which are stored in the system's memory 182. As explained above, the imager's frame rate is sufficient to obtain multiple images of each object as it passes through the field of view. Furthermore, the memory is sufficiently large that multiple images from each of multiple objects can be stored.

In one embodiment, the memory 182 defines a ring (or another type) buffer with approximately 160 storage elements, which requires just under two megabytes of storage, and which is capable of storing about 0.8 seconds of a production run at 200 frames/second, or about 0.32 seconds at 500 frames/second. Clearly, lower frame rates can be used to increase the amount of time for which images can be stored. The ring buffer continually replaces older stored frames with new ones in the sequence, remaining filled. Once image capture has terminated, the ring buffer contains a sequence of images available for display for a human user.

Figure 7:
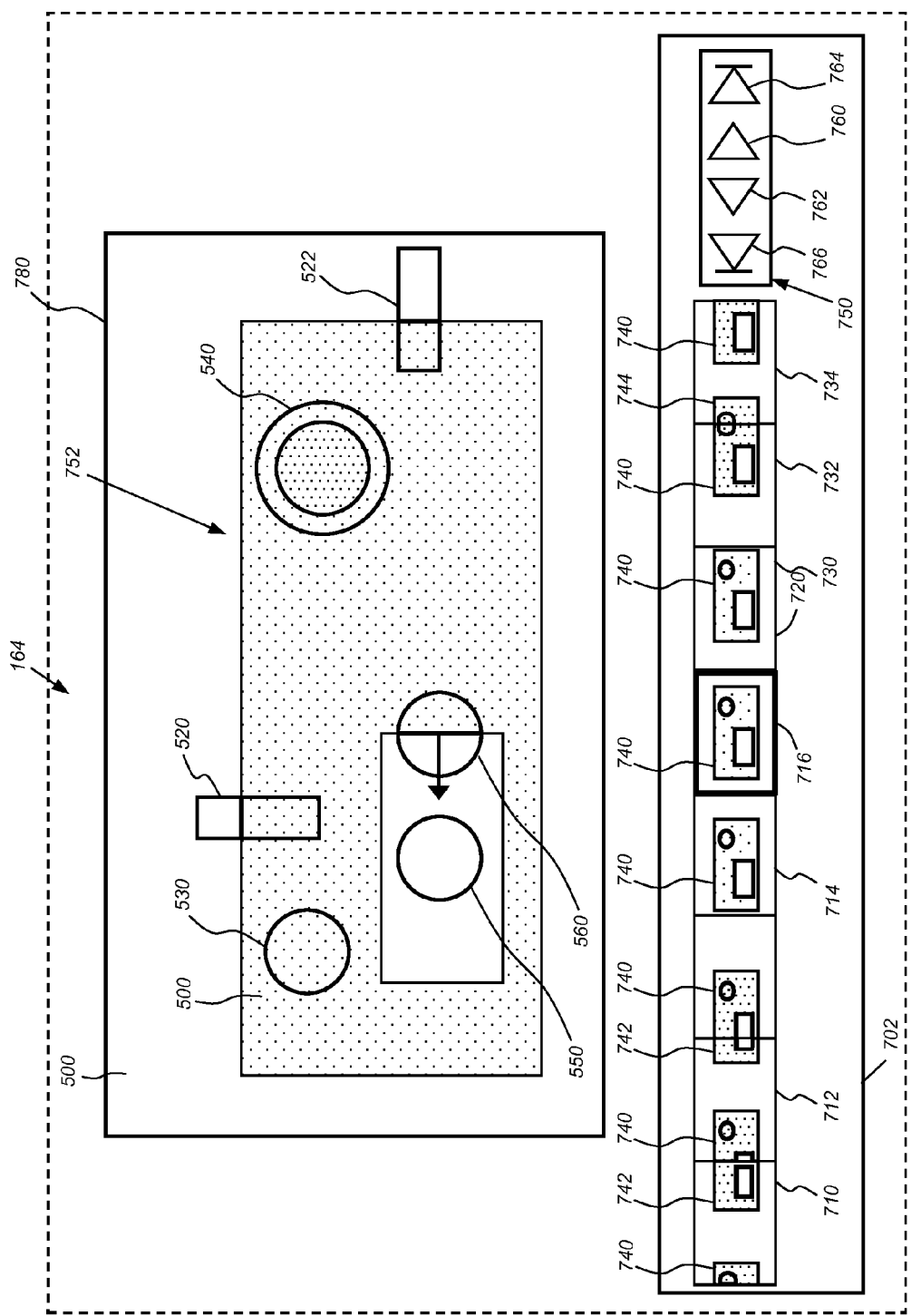
FIG. 7 is a somewhat schematic diagram of an exemplary HMI graphical user-interface (GUI) display including an image view and a frame filmstrip viewer used to configure, monitor and adjust the exemplary machine vision detector system of FIG. 1.

Referring to FIG. 1, the vision detector may be connected to a human-machine interface (HMI) 162 via communications link 160, for purposes of configuration. It is also possible for the HMI to be part of the vision detector 106, but this is less-preferred because the HMI is generally not needed for production use, and so one HMI can be shared among many vision detectors. The HMI in this example runs the graphical user interface (GUI) 164 of this invention, which is described in detail below. A fragmentary, simplified version of the GUI 164 is shown in FIG. 7.

The GUI 164 allows a portion of the sequence of images (see image 700 in GUI window 780) of viewed objects stored in vision detector memory 182 to be displayed for a human user. In the illustrative GUI 164, a filmstrip window 702 displays a plurality of thumbnail images 710, 712, 714, 716, 720, 730, 732, 734, each thumbnail image being a low-resolution version of a corresponding image in sequence of images 700. Generally, the thumbnail images correspond to consecutive images in the sequence, for example displayed portion, but other arrangements may be useful, such as skipping some number of images between the corresponding thumbnails.

A set of scrolling controls 750 is provided in, or adjacent to, the filmstrip window 702 for advancing the displayed portion 752 forward or backward within the sequence of images 750. Next-image control 760 advances displayed portion 752 forward by one image, and previous-image control 762 advances displayed portion 752 backward by one image. The controls 764 and 766 are described in details below.

The thumbnail 720 displays a low-resolution image of object 500, which may correspond, for example, to the object 114 (FIG. 1). Object 500 also appears in thumbnails 716 and 730 at slightly different viewing perspectives (positions within the field of view), and is partially present in thumbnails 710, 712, 714, 732 and 734. A second object image 742, which may correspond for example to defective object 116, is partially present in thumbnails 710 and 712. A third object 744, which may correspond for example to object 112, is partially present in thumbnail 734. By issuing scrolling commands using scrolling controls 750, the user can advance the displayed portion 752 forward or backward to see any viewing perspective of any object that has been captured, as well as any other conditions that may be present in the image sensor's field of view during normal production.

In the illustrative GUI 164, the image corresponding to thumbnail 720, which is shown with a heavy outline, is also displayed at full resolution in the image view window 780. As scrolling commands advance the displayed portion forward and backward, different images will move into thumbnail 720, and be displayed at full resolution in image view window 780.

To configure the vision detector, the user issues scrolling commands until an image appears in image view window 780 that is suitable to use as a first training image. Generally, an image is suitable if the user judges it to be sufficiently similar in appearance to the typical objects that will be inspected. Note that the object in image view window 780, to object 740 in thumbnail 720. Once a first training image has been chosen, the user configures the vision detector by creating one or more vision tools, for example Locators 520 and 522, Contrast Detector 540, Brightness Detector 550, and Edge Detector 560. In the illustrative GUI 164, a vision tool can be any Photo. The type, position, size, orientation, and operating parameters of each created vision tool are chosen by the user to insure that objects similar in appearance to the object in the first training image can be detected and inspected.

Once a configuration has been created using the first training image, it is desirable to confirm and possibly adjust the configuration using additional training images. Scrolling commands can be issued to choose a second training image, which will appear both in thumbnail 720 and image view window 780. The second training image can be used simply to assess the operation of previously created vision tools, or to update the configuration by creating additional vision tools, or adjusting the position, size, orientation, and/or operating parameters of previously created vision tools.

For example, the initial configuration created using the first training image may not have included Brightness Detector 530, which as previously described is used in conjunction with Locators 520 and 522 to help detect the presence of the object. It may be that the user did not realize, looking only at the first training image, that Brightness Detector 530 would be needed. It may be that only by considering a second training image, where an object is only partially present in the field of view, or in which no object is present, could the user ascertain that Brightness Detector 530 is needed to prevent false detection.

Similarly, it may be that a second training image corresponding to the defective object 116, which is dissimilar in appearance to the typical objects to be inspected, is necessary to properly adjust Contrast Detector 540.

As will be made clearer below, the invention herein described can be used to configure any image analysis device, including prior art vision systems of various types.

During the process of configuring a vision detector it is desirable to test the configuration more extensively than can be accomplished using second training images to assess vision tool operation. It is further desirable that such a test include a large number of objects, and capture and store a limited number of images, where those images correspond to objects likely to represent incorrect decisions. Similar tests may also be desirable during actual production operation. It is desirable that the production environment, including conveyer speed and ambient illumination, be substantially the same during both configuration and production operation. A primary difference between the production operation of FIG. 1 and configuration, is that the reject actuator 170 is not receiving reject signals from vision detector during configuration.

In an illustrative procedure used for testing a vision detector, the vision detector is initially configured for detecting and inspecting discrete objects. The vision detector may use visual event detection, operating as shown in FIG. 2, or an external trigger signal, operating as shown in FIG. 3.

Referring to FIG. 2, a group of seven frames starting with active frame 240 and ending with inactive frame 248 (timeline portion 200) influences the detection and inspection of Object 1. Similarly, a group of five frames corresponding to timeline portion 210 influences the detection and inspection of Object 2. If an object such as Object 1 or Object 2 is likely to be of interest to a human user, typically because it might represent an incorrect decision, this implementation provides methods and systems to store and display the frames in the group. For example, the group to be stored and displayed can include inactive frames such as frame 242 and terminating frames 246 and 248. In one example, terminating frames such as 246 and 248 are omitted from the group to be stored and displayed.

Referring to FIG. 3, where an external trigger is used, the group of frames to be stored and displayed for Object 1 includes all frames captured and analyzed for that object, i.e. frames 340, 342 and 344.

As previously described, objects are analyzed to determine results that contain information about the status of the object. The results may be as simple as whether or not the object passes inspection. The results can include numbers that indicate a relative confidence that the object has been detected, and that it passes inspection. For example, one such number may be the weighted average of object pass scores, where an object is judged to pass inspection if that number exceeds some decision threshold, where the decision threshold is 0.5. Similarly, when using visual event detection, one such number may be the number of active frames or the total object detection weight, which is compared to a decision threshold to determine if an object has been detected.

These results are used to determine if the group of frames for the corresponding object might be of interest to a human user, in which case they would be stored for subsequent display. The user may be interested in all objects, or just those that pass or just those that do not pass. It is often most desirable to store and display images corresponding to objects likely to represent incorrect decisions, because these represent both very rare occurrences, and situations most in need of careful study. An incorrect decision is likely when numbers that indicate a relative confidence are close to the decision threshold.

The stored groups of frames is a set of images, a portion of which can be displayed by a graphical user interface such as that shown in FIG. 7 as described above. The scrolling controls 750 contain, in addition to next image control 760 and previous image control 762, a next-group control 764 and previous group control 766, which advance the displayed portion forward and backward, respectively, by one group. These and other features of the GUI 164 will now be described in detail.

D. Graphical User Interface According to an Illustrative Embodiment

Figure 8:
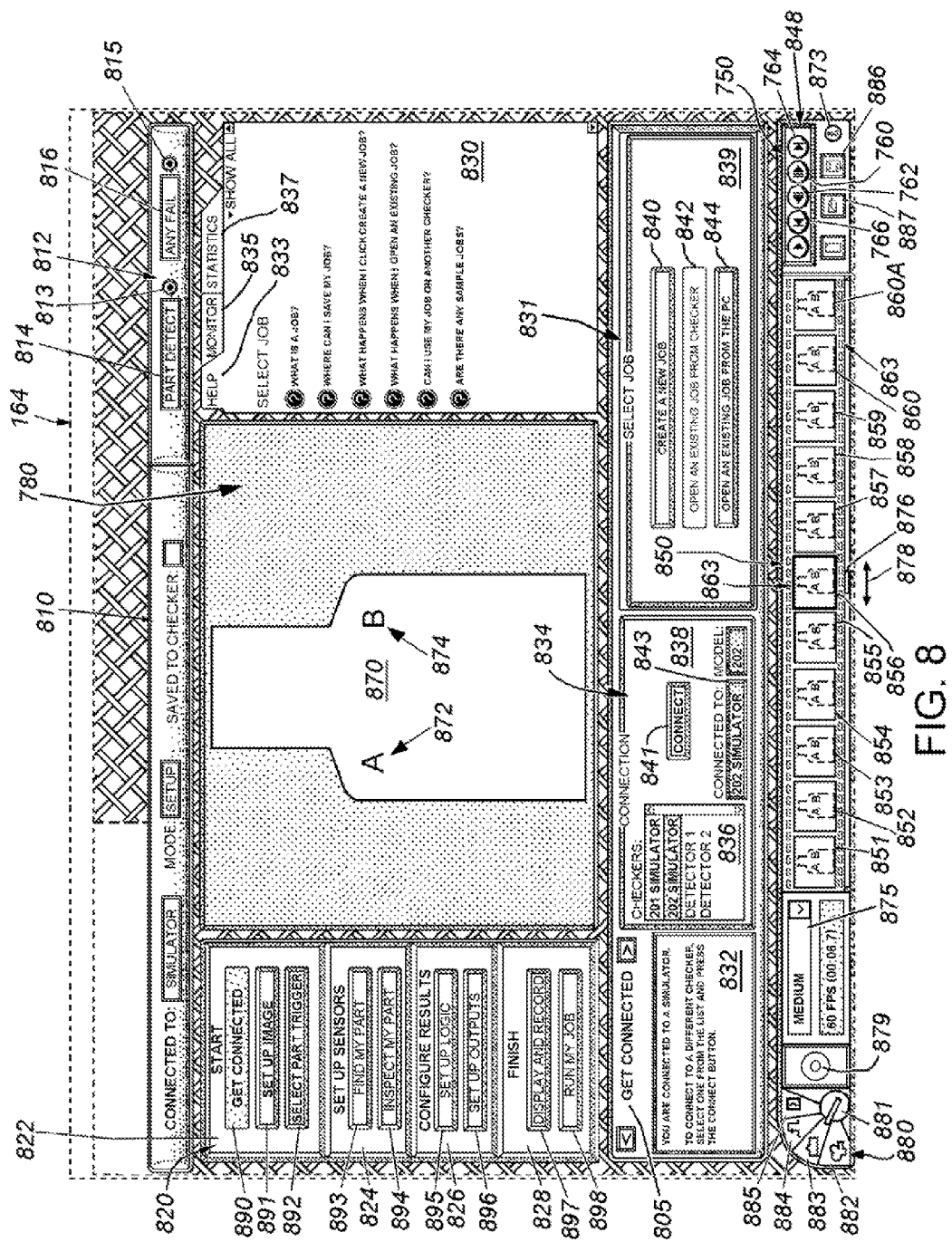
FIG. 8 is a diagram of a GUI display in the initial vision detector connect mode according to an illustrative embodiment.

A view of the GUI 164 in accordance with an illustrative embodiment is provided in FIG. 8. While the exemplary implementation is part of an HMI that is interfaced with a machine vision detector system, this GUI can be adapted to use with any acceptable machine vision system, particularly those that employ image views and play-back of stored images in their configuration and/or operation. Thus the reference to the machine vision detector system should be taken by way of example.

It should be understood by those of ordinary skill that the following description of various layouts and functions attributed to the novel machine vision GUI described herein can be implemented using conventional programming techniques in any one of a variety of commercially available programming languages and/or environments. Accordingly, the following description is directed to the novel and convenient layout of GUI interface elements and the functions that are carried out using these elements. The underlying mechanisms used to perform the functions available on the GUI should be readily programmable by those of ordinary skill, particularly when provided with the teachings of this description and those teachings that are incorporated by reference herein.

The GUI 164 comprises a plurality of discrete windows, each of which performs a predetermined function, or group of functions. The upper strip 810 includes information relating to the current status of the HMI connection (name of the particular connected sensor(s)), the operative mode of the HMI (setup, test, run, etc.), the save-status of a current job, and indicators of object-specific-status (object-pass/fail, object-detect, etc). This status is displayed on the right side in the form of an "LED" style indicator strip 812 with simulated LEDs 813 and 815 that indicate the state of certain user-defined inspection criteria defined in boxes 814 and 816, respectively. This strip 812 is described further below.

The center pane 820, beneath the upper strip 810 comprises the image view window 780, described above. This window presents the current image view, either during runtime, or playback of recorded images. The image view window 780 can be sized appropriately to allow an adequate view of the subject. The image view window can be adapted to display a grayscale or color image of the object as appropriate. As described below, the image view window 780 displays a grayscale view in this example with predetermined Locators and Detectors appearing in variable colors.

The left pane 820 of the GUI 164 extends along the side of the image view window 780. The left pane contains a series of buttons that enable control of the various basic functions and modes of the HMI. The buttons are arrayed in a vertical orientation in this embodiment (although other placements and orientations are expressly contemplated), and define generally the steps needed to setup, configure and run a project in the logical/sequential order normally encountered by a user. This makes the overall setup, configuration and testing process easier for new and occasional users. The buttons and their underlying functions are described further below.

The right information pane 830 provides information to the user on a variety of topics including general help, the monitoring of functions and statistics on a job. The respective functions are called up by clicking on one of the respective tabs 388, 835 and 837. These tab ear accessible during runtime and at any time during setup, and can be adapted to provide help tips and other information that is relevant to the current mode, as indicated by the highlighted button in setup pane 820.

The horizontal pane 838 below the window 780 and panes 820, 830 contains variable information, dependent upon the selected function on the button pane 820. The lower control pane 831 includes a dialog box 832 that provides text appropriate to the selected functions. For example, the box 832 presents instruction to proceed with a part of the setup or configuration task. The central box 834, adjacent the dialog box 832 controls the present action taken by the user and reports upon resulting or requested status/information. Depending upon the current mode, the central box 834 extends across the full right side of the control pane 831, or a relevant portion thereof. The depicted mode defines the sensors to which the HMI is connected. As such, the box 834 includes a list or menu 836 of the individual sensors (as well as any computer-simulated sensors) to which the HMI has been set-up to recognize. Note that the GUI employs the term "sensor" to describe elements from the above-referenced Detector Class. The box 834 also contains an action box 838 that sets up the connection with a selected sensor in the menu 836. In the depicted mode, the right box 839 of the control pane 831, allows the user to select a job to work upon. In this mode, the selections include a new job (button 840), an existing job stored on the selected sensor (or simulated sensor) (button 842), or an existing job that is stored on the HMI (button 844). Note that a job may be stored on the HMI (PC in this example) as a file for simulation or subsequent download to a sensor's memory.

The bottommost pane 848 includes the thumbnail display 850 and control buttons 750 as described generally above. The thumbnail display is provided with the graphical representation of a "filmstrip" in which between 10 and 11 individual thumbnails 851, 852, 853, 854, 855, 856, 857, 858, 859, 860 and 860A, are displayed in a simulation of a film reel with frame dividers 861 and perforated film edges. The specific layout, appearance and number of frames used in the thumbnail display 850 are all highly variable in alternate embodiments. In this embodiment, each thumbnail 851-860 represents a low-resolution version of a particular image frames in a sequence of images captured by the detector, each representing a discrete image view of an object (a bottle). The central thumbnail 856 has a highlighted border 862. This indicates that the particular thumbnail is displayed in the image view window 780. As shown, the object image is an exemplary bottle with a defined outline and at least two surface features 872 and 874 that can be used to form the basis for detection (or another machine vision operation).

The thumbnail display 850 contains a slider 876 that can be moved (double arrow 878) to scroll through each of the thumbnails contained in the overall buffer of image views. To the left of the thumbnail display, in filmstrip pane 848 is a selector 880. This selector provides a simple set of control functions that can be applied to the filmstrip, in the manner of a conventional video camera, commonly familiar to a large number of users. The selector is moved between mode options using a rotating knob 881 that selectively highlights the chosen mode. These functions are described in detail below.

Referring again to the main button pane 820, the buttons are arranged in boxes that correspond to discrete functions performed by the HMI and arranged from top-to-bottom in accordance with the steps performed by a user to run sequentially from connection, to setup, to configuration to test-and-run of a job. Each button calls a particular set of GUI elements. In general, the left button pane 820 and image view window 780 are constant through all GUI screens. The uppermost Start box 822 is used to start the process. The first button 890 allows the user to connect to a vision detector or to a detector simulation program. Note that simulations are useful in providing fault diagnosis and technical support, as they present a known set of parameters in the simulation that allow technical support personnel to diagnose user errors in setting up the system. As discussed above, pressing the button 890 calls up box 836 with a list of all real and simulated vision detectors (also identified by assignee's trademark "Checkers™"), and allows the user to select one for connection and subsequent setup via the connect button 841. The connection is reported in the connected-to dialog box 843. The highlighting of this button indicates that it has been activated, in the manner of a "real" light-up button on a control panel. The next button 891 in box 822 allows the user to set up and train an image—for example an image of a bottle 870 to be detected. The next button 892 allows the user to set up external triggers (if desired), that can be used to detect the presence of parts—as described above.

The next, Set Up Sensors, box 824 includes buttons to adapt the sensors to locate parts in an image field. The first button 893 allows the user to configure and test finding the part for which an image is trained within a field of view. The second button 894 allows a user to configure and test the actual inspection of parts for selected characteristics (such as features 872 and 874).

The next, Configure Results, box 826 contains buttons that allow the user to define how the inspection results are employed and where the results will be output (e.g. to an alarm, a reject actuator, etc.). Hence, the first button 895 places the user into a logic window that enables ladder logic schemes to be defined. The second button 896 is used by the user to define the outputs of logical decisions.

The final, Finish, box 828 includes a display and record button 897 that permits the user to customize which events are shown in the GUI display and how these are recorded into files for later viewing. In general, the HMI allows viewed image sets to be recorded and replayed as desired for diagnostic and other purposes. The final button in the vertical array is a job-run button 898 that provides runtime operation of a given job, once it has been configured and tested. Beneath the button pane 820 is located a scroll tab 805 that lists name of the currently highlighted mode/mode button 890-898 and allows the user to toggle to the next or previous button in the vertical sequence without need to click upon the actual button.

1. Filmstrip Control and Manipulation

As described generally above, the thumbnail or filmstrip pane 848 is simulative of a consumer video recording appliance. The functions provided are generally applicable during any part of setup mode (all buttons except run 898). During a run mode (button 898), recordings are made based upon specific, preprogrammed criteria (for example, continuous record of most recent frames; record detected, failed parts only and the surrounding frames, etc.). In setup mode both runtime images from a live image feed can be recorded (a moving line) and images from a prerecorded file can be reviewed and manipulated. The number of frames recorded can be highly variable (for example, between 160 and 16,000 frames, depending upon the system memory size (for example between 2 and 200 megabytes).

The filmstrip selector 880, positioned to the left of the filmstrip 850, allows the recording of runtime image acquisition by selecting setting 882 (e.g. the movie camera icon). The images are loaded into a video file such as the readily available .avi format. The file is stored on the HMI and can be retrieved, edited and e-mailed to others for the purpose of, for example, quality control or technical support. The selector 880 also allows the user to acquire particular images within a filmstrip recording by selecting the camera icon 883 (e.g. a still camera mode). The highlighted-border of the central thumbnail 856 represents the present image in the image frame window 780. The thumbnails surrounding this image 851-854 and 856-860 represent the immediately preceding and immediately succeeding images in the sequence. The central thumbnail can be selected via the slider or by playback using the control buttons 750. The selector 880 also provides setting 884 for external trigger mode. This setting allows the user to record images as a result of an externally triggered event. Pointing the selector 880 to the arrow icon 885 places the filmstrip and image frame window 780 in playback mode, which allows the user to play back the images in the filmstrips that have been composed and stored. It should be clear that the selector modes 882 and 885 provide the user with a highly familiar analog to the recording and playback modes on a video camera, making the process more intuitive for occasional or novice users.

To this end, the control button region of the filmstrip pane 848 includes a record button 879 that simulates a conventional video appliance recorder. This button allows the user to capture a fragment of an overall recorded filmstrip as it is presented in real time or from a previously stored file. A recorded file can be stored in the HMI, by clicking the save icon 877 adjacent to the control buttons 750. This opens a conventional file-system window 900, shown in the fragmentary view of the GUI 164 in FIG. 9. In this embodiment, the window 900 includes a drop-down box 910 that allows the recorded file to be saved in an appropriate format, such as the HMI's "filmstrip" format (.film) 912 using standard file-system commands. The .film format preserves the unique aspects of a filmstrip as organized by the HMI. This format supports metadata relating to the film strip frames' unique properties, which are usable when the strip is played on the GUI 164. These properties can include data relating to frame rate, detector identification, etc., as described in further detail below). The box 910 includes other format types into which a filmstrip can be saved, including a conventional (.avi) movie format and single-frame (.bmp) format (for still camera mode). Note that a number of specialized formats with particular features and options can be implemented (for example .film1, .film2, etc.).

Figure 9A:
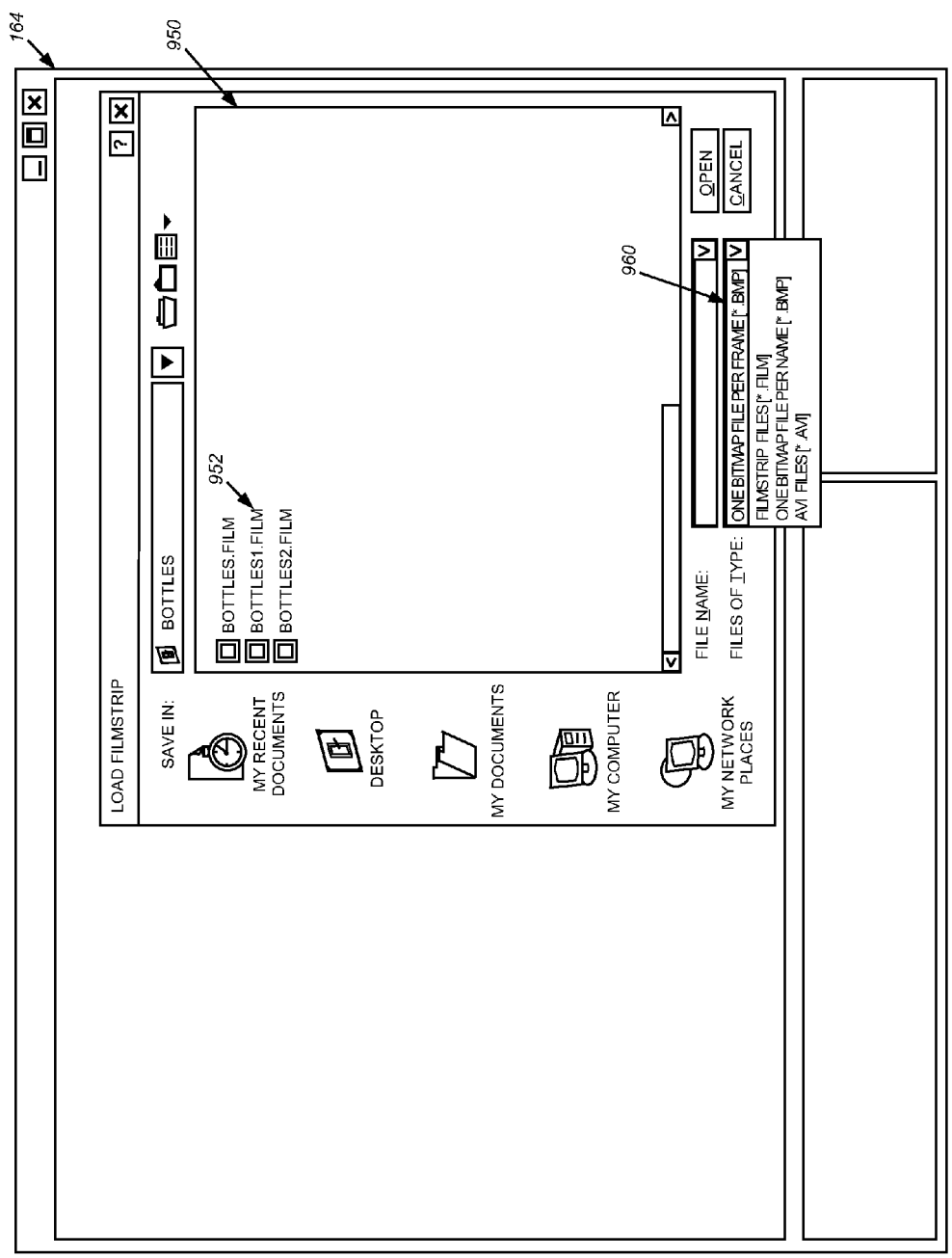
FIG. 9A is a diagram of a save-filmstrip window selected from the GUI display of FIG. 8.
Figure 10:
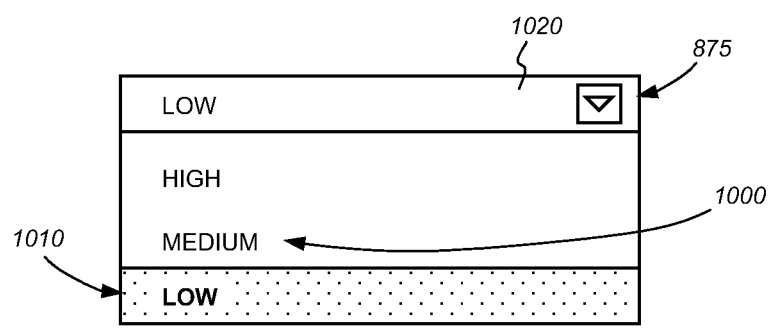
FIG. 10 is a diagram of a filmstrip frame rate drop-down box selected from the GUI display of FIG. 8.

By clicking on the adjacent file folder icon 887, the user can open an existing filmstrip. The folder toggles a conventional file-system window 950 (FIG. 9A), which allows the user to access files 952 in an appropriate format. This window 950 also includes a drop-down box 960 that allows retrieval based upon a file type (including the .film format) that is supported by the GUI 164.

As described above, the recording speed of a created film can be varied by selecting an appropriate film speed prior to pressing the record button or during a save operation. A speed selection box 875 is employed to vary the size of the saved file. For example, the frames per second can be modified. The original video is provided from the sensor at native speed. The box allows this frame rate to be approximately preserved in the saved file (High) or a number of alternate, lower rate speeds can be chosen from the drop-down menu 1000. In this example, the user selects Low 1010, which may correspond to 10 fps and the word Low appears in the dialog box 1020 as the selected frame rate. The number of speed settings and how they are displayed is highly variable. A High setting having a rate of 500 fps or more can be employed, with other settings providing various lower rates. Note that the actual content of captured frames may depend upon the current mode of the sensor. For example, in self-trigger mode, the sensor captures the frames around the detected presence of sensed parts, and not in any intervening dead space.

Figure 11:
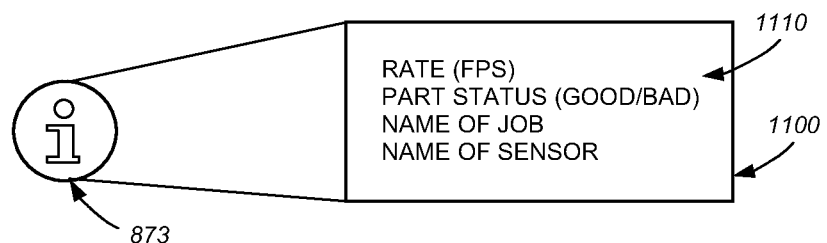
FIG. 11 is a filmstrip frame information window selected using an information button on the GUI display of FIG. 8.

The GUI 164 also provides an information button 873 that opens a window 1100 (shown in FIG. 11), which lists information on a selected frame. This information is useful in determining the characteristics of that frame. It can be based upon preprogrammed information stored in the sensor and input by the user via the GUI 164. For example, the information displayed 1110 may include the frame rate at which the data was recorded, the status of the part (i.e. good part/defective part), the name of the job and the name of the sensor that acquired the original images.

2. Highlighting Discrete Filmstrip Sections

Figure 12:
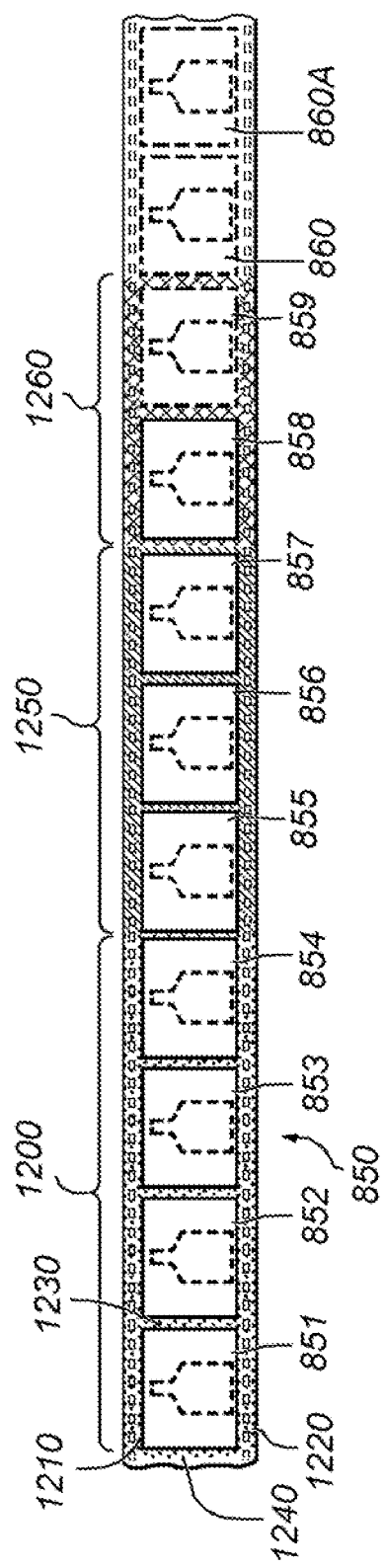
FIG. 12 is a diagram of the filmstrip display including color-coded frames of the GUI according to an illustrative embodiment.

The filmstrip can be provided with highlighting (for example, the border of the central, target thumbnail 856) and color-coding to enhance the information displayed therein. Referring to FIG. 12, the exemplary filmstrip 850 is shown individually to illustrate this feature. A grouping 1200 of frames (851-854) each include top and bottom borders 1210, 1220 and side borders 1230, 1240 that are shaded to depicted a discrete color, pattern or grayscale shade. Another grouping 1250 of thumbnails (855-857) is shaded to represent a dissimilar color, pattern or shade. Optionally, a third grouping 1260 of thumbnails (858-859) is shaded to represent a third dissimilar color, pattern or shade. Thumbnails 860 and 862 to the far right are depicted as unshaded and not falling into a subject criteria. The number of colors, patterns and/or grayscale shades employed is highly variable, and the number and location of shaded thumbnails displayed in FIG. 12 is only by way of example. While the color, etc. is applied to the entire surrounding border of a thumbnail, so as to leave the central image unobscured, the color, etc. can be applied to a portion of the border or across all or a portion of the actual image ion alternate embodiments.

Each dissimilar color/pattern/shade represents a frame that satisfies (or fails to satisfy) a predetermined criteria. For example any red frames may represent an image that has been deemed to represent a failed or defective part, while green frames represent an image that satisfies a passed part. Yellow frames may indicate a barely passed part. Other colors, etc. may represent other criteria.

There are a variety of schemes that can be employed in coloring/patterning frames. In one scheme, each individual frame is provided with a discrete code that indicates whether that frame satisfied the criteria. In this scheme, a user may have a passed part in which certain underlying frames barely pass or fail, but overall provide a passing score for the part. The color of frames allows the user to quickly examine each passed, barely passed and/or failed frame to determine if adjustments to the configuration of the sensor are needed.

In another scheme, all frames identified with a given passed, barely passed or failed part are colored/patterned the same so that the user can delineate the frame of a given part. It is contemplated that appropriate buttons can be provided to select between schemes within the filmstrip so that, for example, a group of frames all associated with a failed part (e.g. all red) can be clicked, and converted to reveal their individual status (e.g. some red, some green and some yellow—together adding up to a failing score). In an illustrative embodiment, clicking on a thumbnail of interest converts that frame into the highlighted (see thumbnail 856 in FIG. 8) frame and causes the enlarged image to be displayed in the GUI image view window 780.

Note that while the criteria of this example are pass/fail, the coloring/patterning can also apply to other user-defined criteria. For example red may represent bottles with a "Cherry" on the label, while green may represent an "Apple" on the label. To this end, it should be noted that individual sensors (Detector Class elements) can be responsible for determining the presence or absence of individual features, by applying appropriate configuration logic as described below, the presence and/or absence of a feature reported by particular sensor can lead to different outcomes. For example, different types of failure can be reported. Also, where the choice is between (for example) cherry and apple, the presence of the feature at the appropriate sensor and/or absence at another can be used to make the determination of which part is present (cheery or apple).

The satisfaction of a particular criterion can also be displayed on a part-by-part basis in the above-described "LED" style indicator box 812 at the top of the GUI 164. The user may define the criterion (e.g. part detect), which is displayed in the box 814. Satisfaction of the criterion by a part is illustrated by a green LED 813, while failure may cause the LED to glow red. Other, or different, LED colors can be used to indicate various states. Likewise, a second LED 815 is provided and associated criterion box 816 is provided to indicate a second related (or unrelated) criterion. In this example, the LED lights if any failed parts are detected. The number of LEDs and criterion boxes is highly variable. In general, the number and presentation of such indicators should allow the user to quickly and easily ascertain status.

To this end, colors/patterns on filmstrips can be used to indicate subcriteria. For example, an overall part failure may be based on one of three different failed components (or more). The colors/patterns on the individual thumbnails can be used to indicate the specific, detected reason(s) for failure, while the LED indicates the overall failed status for a part.

It should be clear that a variety of coloring/patterning schemes can be employed according to alternate embodiments of this invention. In general, this invention contemplates that the thumbnails in the filmstrip be provided with individual indicia that allow the thumbnails to be identified as possessing certain sensed characteristics of interest to the user.

3. Vision Detector Setup Controls

Figure 13:
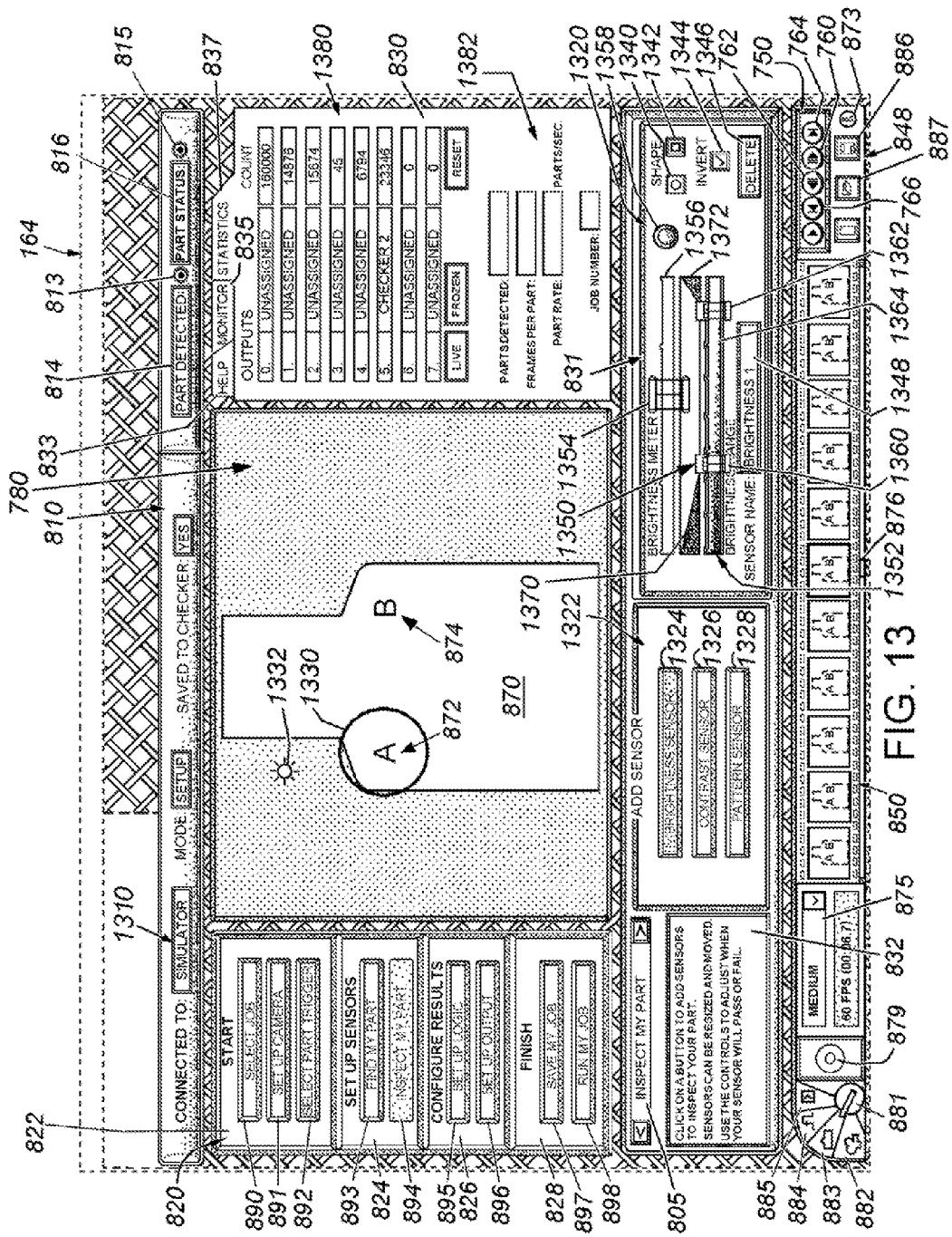
FIG. 13 is a diagram of the GUI display in the vision detector setup mode according to an illustrative embodiment.

With reference now to FIG. 13, once the user has connected to a live or simulated sensor (as indicated by the box 1310 on top strip 810), the GUI allows the sensing parameters of that vision detector to be set. In particular, the user can assign Locators and sensors (Detectors from the above-described Photos class) to a training image. The user toggles one of the buttons in the Set-up box 824. The first button calls a screen that allows locators to be placed on the image 870. This procedure is straightforward. The second button, which has been activated, and is highlighted in FIG. 13, generates boxes 1320 and 1322 in the lower control pane 831 that assist the user in setting up sensors of various types. Specific types of sensors are selected using buttons in the central box 1322, which include brightness 1324, contrast 1328 a discrete pattern 1328. Other types of sensors can also be provided. In this example, the brightness button 1324 has been activated (and is highlighted on the GUI), this allows produces a brightness adjustment box 1320 with controls specific to setting up the parameters of a brightness sensor on the image 870. The sensor is defined by the circle 1330 placed on image at a desired location by the user. The size of the sensor is also chosen by the user—typically using a mouse control. The sensor circle 1330 can be colored to define a particular type of sensor and/or can include an icon 1332 that indicates its type (or other relevant information about this sensor). The brightness sensor control box 1320 provides a number of user-friendly interface features. The shape of the sensor is chosen using a pair of shape boxes 1340 and 1342. Two shapes for the sensor are selectable—a round shape (button 1340) and a square shape (button 1342). Other, or different, shapes (or a user-defined shape) can be included as options in alternate embodiments. The control box 1320 also includes an invert selector that allows a user to invert the detection so that, for example, the sensor functions as a darkness sensor within a bright field. The box 1320 contains a delete button 1346 that allows the user to remove an existing sensor from the image. The name of the sensor currently being viewed ("Bright1" in this example) is listed in a box 1348.

The brightness sensor control box 1320 further includes a pair of slide rule-style adjustment knobs 1350 and 1352 that allow the user to adjust the level of brightness detected and the range of brightness detected, respectively. The brightness knob 1350 includes a slide adjuster 1354 that moves along a scale 1356. The left hand side of the scale is colored red, while the right hand side is colored green in this example. Other sets of dissimilar colors or dissimilar patterns can be used in alternate implementations. This knob 1350 sets the level of brightness a feature within the sensor 872 that will trigger a positive reading. A positive reading is reported by the simulated LED 1358, which glows green (or another color) when the sufficient brightness is detected.

The lower, brightness range knob 1352 includes two separate sliders 1360 and 1362 that can be slid by the user independently along a scale 1364. The scale includes a generalized graphical representation of a gradient that extends from dark on the left side to light on the right side. The range defines the level of brightness in which the sensor will operate, rejecting either excessively bright or excessively dark subjects. The range button sliders 1360 and 1362 are tied to a central graphical pattern that defines a pair of right triangles 1370 and 1372, respectively. The inner corners of each triangle intersect with the center bar of the respective slider. Thus as the sliders move along the scale, the triangles grow or shrink providing additional visual feedback to the user.

The controls provided from contrast sensors (activated by button 1326) and pattern sensors (activated by button 1328) function similarly to those described for the brightness sensor. For example, the contrast sensor control can include slide knobs for contrast level and range. The pattern sensor contains various buttons relative top training a pattern from the image 870.

The GUI display of FIG. 13 also shows the Statistics tab 837 in right information pane 830. This tab has been configured by the user to contain two boxes, although the precise makeup of the tab can be varied to provide statistics on events that are meaningful to the user. In this example, the tab 837 contains a box 1380 with a listing of outputs and the number of discrete events counted for each—for example each part detect event. The tab 837 also includes an exemplary box 1382 showing events related to external trigger activities. Note that the number of part detect events counted depends upon whether the vision detector is placed into internal trigger mode or free-running mode. In internal trigger mode, the detector analyzes a group of frames in which a part is present and assigns a single part detect event to the entire group. Conversely, in free-running mode, each frame in which a part is present is asserted by the detector as a part detect event.

4. Vision Detector Configuration and Logic

Once appropriate locators and sensors have been set up and adjusted, the user then generates the appropriate relationships between detection and the results of such detection. Each of the buttons in the Configure Results box 826 is, thus, activated in turn. Referring now to the GUI 162 in FIG. 14, when the user activates and highlights the Set-Up Logic button 895, he or she is presented with a logic programming field 1400 within the image view window 780. This screen and applicable GUI buttons/information from the lower control pane 831 can be expanded to a larger size as shown in FIG. 14A by clicking upon the logic screen button 1400 in the main GUI screen 162. In this enlarged arrangement, the programming field 1400 takes up the entire upper window, while the screen control pane 1431 resides below the field 1400. The screen control pane 1431 is similar in appearance and layout to GUI control pane 831. It includes a text window with appropriate commentary 1433 on the current actions available to the user; a logic control button set 1426 (now with a Close Window button 1480, that returns the user to the main GUI screen); a Contact assignment window 1442; and an smaller image window 1470. The upper programming field 1400 in the screen allows the user to coordinate brightness, contrast, pattern and other types of sensors with outputs that can include alarms, reject actuator controls, and other responses. A version of this programming approach is described in the above-incorporated METHOD AND APPARATUS FOR VISUAL DETECTION AND INSPECTION OF OBJECTS. The embodiment of FIG. 14 includes features that further enhance the capabilities of the logic programming interface. The window allows the user to build and display an overall logic diagram for each sensor that has been set up in the job.

Figure 14:
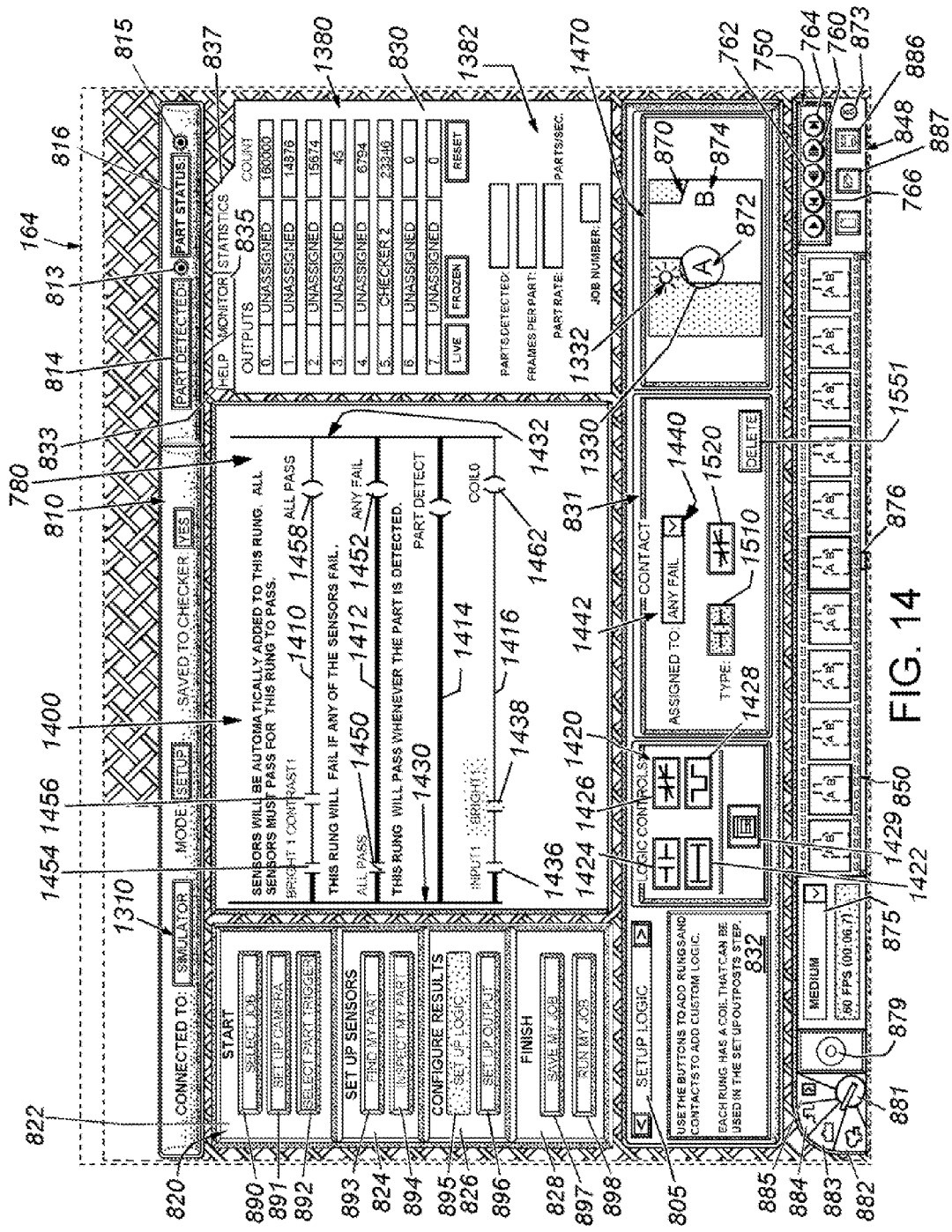
FIG. 14 is a diagram of the GUI display in the logic setup mode according to an illustrative embodiment.
Figure 14A:
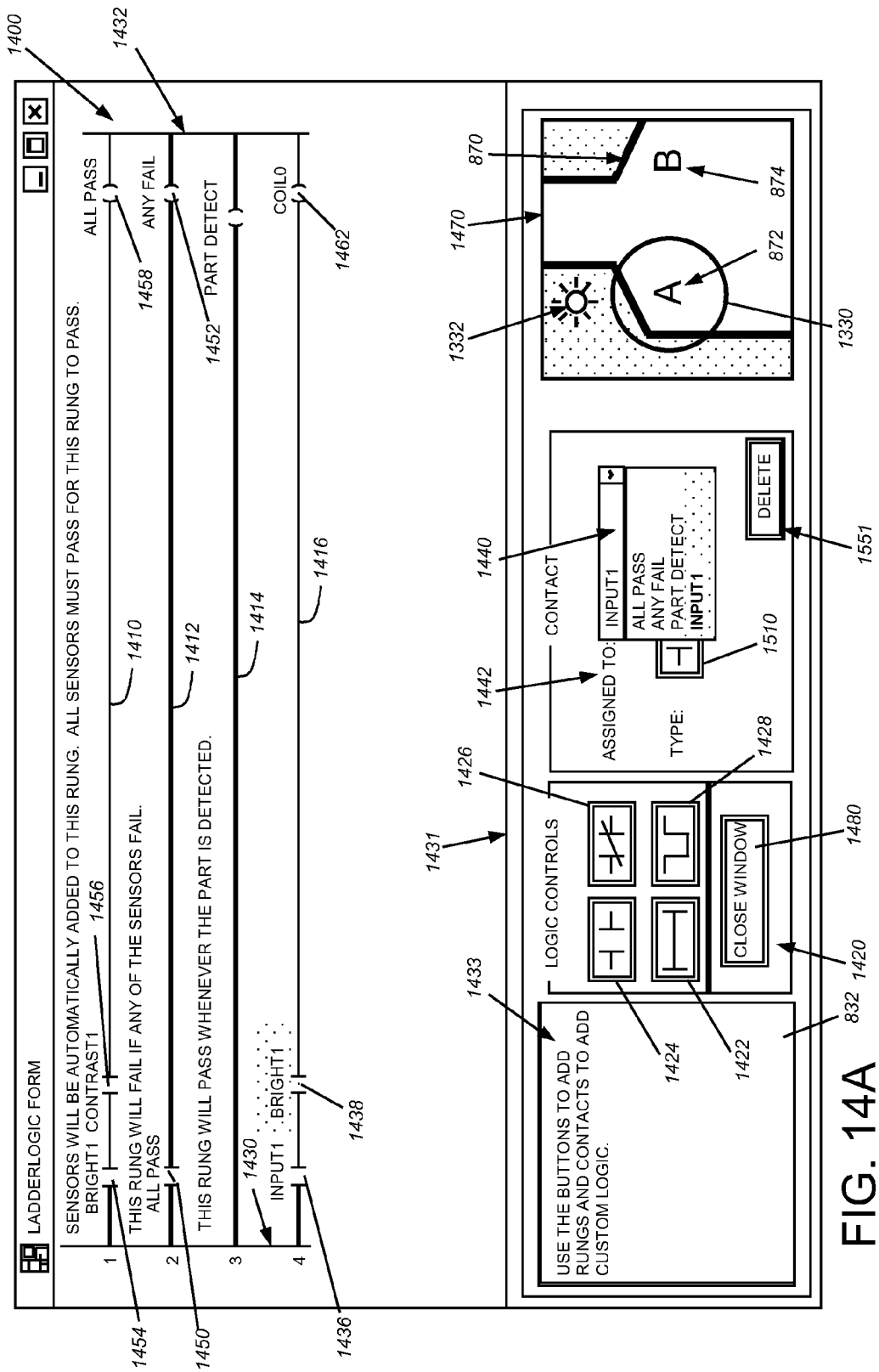
FIG. 14A is a diagram of a separate, enlarged logic programming window that can be called up in the logic setup mode of the GUI display according to an illustrative embodiment.

Referring jointly to both the image pane view of FIG. 14 and the alternative enlarged-screen view of FIG. 14A, the logic implementation includes three default logic rungs, the All Pass rung 1410, the Any Fail rung 1412 and Part Detect rung 1414. These provide users with a basic set of detection tools that can be employed without further modification. In essence, the All Pass result is an ANDing of all sensors and the Any Fail result is an ORing of all sensors. The Part Detect result provides a value by which each part can be identified. However, the logic can be expanded by the user into complex relationships with a large number of variously combined inputs and resulting outputs.

In the example of FIGS. 14 and 14A, the user has assigned a new rung to the ladder by clicking the Add Rung button 1422, which resides with a set of logic control buttons 1420 in the control pane 831 (FIG. 14), and at the bottom left of the large screen control pane 1431 (FIG. 14A). These buttons allow the user to add, edit and delete the logical relationships between sensors and display common schematic icons that should be familiar to both novice and advanced users. A new rung is initially established as a straight logical connection between ladder sides 1430 and 1432. In this example, the user has clicked the Add Rung button 1422 (which displays a ladder rung) to create a new rung 1416. Each rung may be provided with contacts that define the inputs from sensors and other data sources. The contacts are appended to the rung using the Add Contact button 1424 (shown as a pair of confronting contact plates). In this example, the user has added two contacts 1436 and 1438. These contacts are each assigned to predetermined sensors, inputs or outputs that are listed in the drop down menu 1440 in a Contact box 1442 to the right of the button set 1420 in each screen (FIGS. 14 and 14A). The contact is displayed on the rung with the name assigned sensor or other data source as shown. The contact may be normally open, or inverted to be normally closed, depending upon the setting in the contact box 1442. See the respective normally open and normally closed settings 1510 and 1512 in FIG. 15. When a contact is normally open an input high value for the sensor triggers a high value (e.g. the contact is closed to allow high value to pass). Conversely, a low value sent to a normally open contact, leaves it open, causing a low value at its output. When a contact is normally closed, a "high" result becomes a low value and vice versa. The availability of normally closed (inverted) contacts is useful in defining various logical outcomes and when combining with other inputs. A normally closed contact may also be placed on the rung by clicking the Add Normally Closed Contact button 1426 (shown as a contact with a slash through it). A normally closed contact is depicted in the ladder field with a corresponding slash—such as that shown for the All Pass contact 1450 on rung 1412. Note that this contact is, in fact, the output coil from the rung 1410. Outputs can be built-into new rungs as contacts, thereby allowing large logical relationships to be created. In this case, by inverting the high data value if all sensors pass, any failed sensors cause this value to go high, providing the desired output for the result Any Fail. This result is represented by the default Any Fail coil 1452.

Each rung includes a coil that defines an output or result of the rung's inputs. By way of example, in the first rung 1410, the contacts for the sensors Bright1 (1454) and Contrast1 (1456) have been logically ANDed by placing them in line with each other. Hence, both Bright1 and Contrast1 must be high to allow the All Pass coil 1458 to signal high. The rung line segments between contacts and coils can be color coded so that the high/low status of a given contact can be determined. For example if the rung is green across the entire ladder, then the contacts are both signaling high, and the output is high. If a contact is low, then the rung segment may be red. If a contact has no signal, then the rung may remain unhighlighted. In the user-defined rung a generic coil Coil0 (1462) is defined. As described below, this can be modified by the user.

Figure 15:
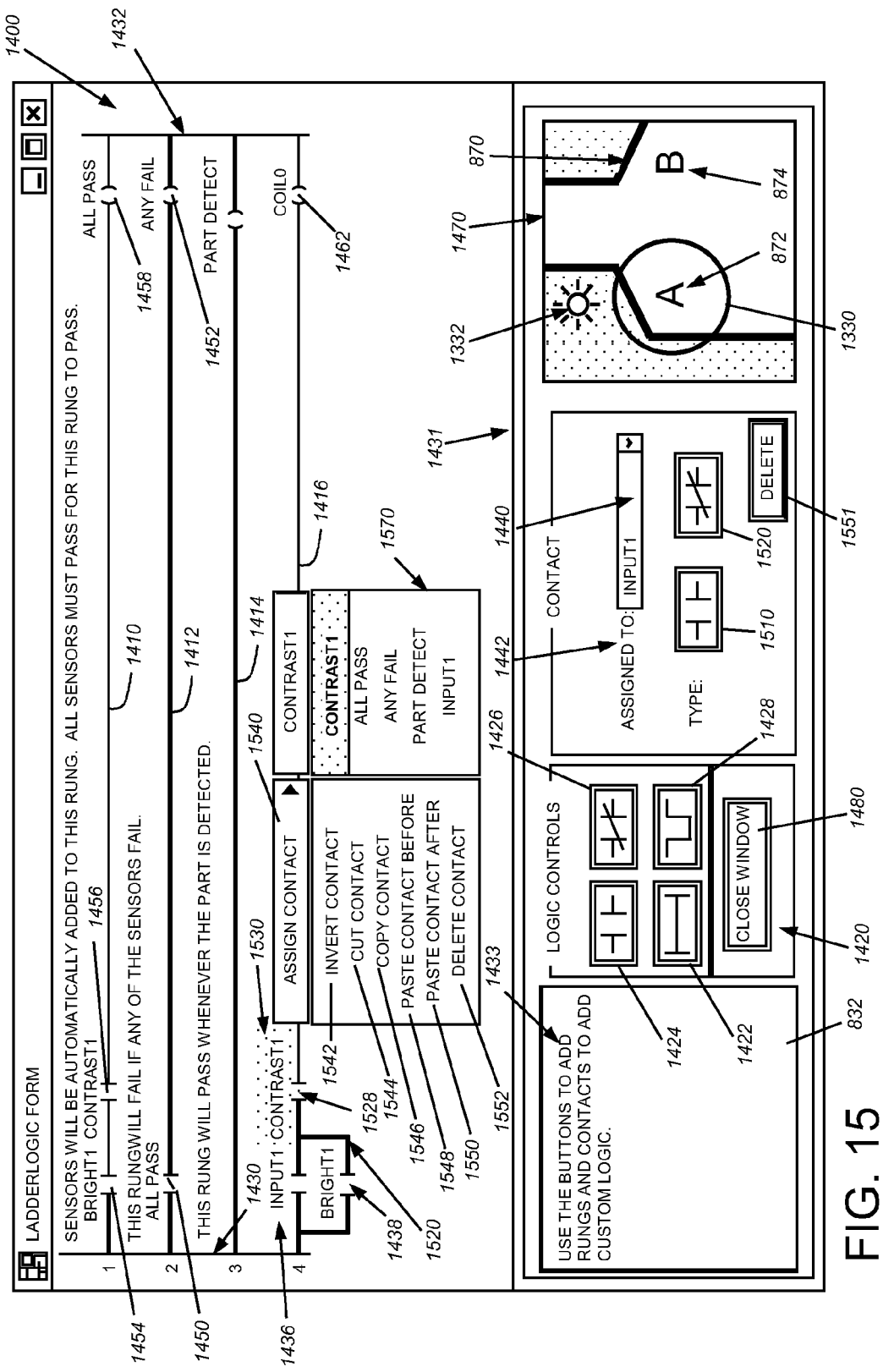
FIG. 15 is a diagram of the logic programming window of FIG. 14 showing a plurality of features available to a user in defining a logic rung.

With reference also to the enlarged screen of FIG. 15, the user can define OR relationships on rungs by adding an OR branch. The Add OR button 1428, shown as a branch, is clicked to add a similarly appearing OR branch of rung segments to the selected rung. In FIG. 15, an OR branch 1520 and the contact Bright1 (1438) has been inserted on the branch. As shown, the user can place the contact Input1 (1436) within the OR relationship by placing it into the rung segment that is enclosed between the OR branches. Notably, each contact, such as the depicted, newly-added Contrast1 contact 1528 can be highlighted (1530) by clicking upon it. This process (double-clicking, for example) opens up a localized drop-down menu 1532 that reveals the properties associated with that contact and allows those properties to be changed based upon a menu. The menu allows assignment (Assign Contact 1540) of a sensor or input source to the contact; inversion (Invert Contact 1542) of the contact (e.g. from normally open to normally closed and vice versa); cutting (Cut Contact 1544) of the contact; copying (Copy Contact 1546) of the contact; pasting (Paste Contact Before 1548 and Paste Contact After 1550) of a copy of a contact to the rung either before or after the subject contact; or deleting (Delete Contact 1552) of the contact from the rung. Contacts can also be deleted using the Delete button 1551 in the contact box 1442. The Assign Contact menu item 1540 opens a further menu 1570 containing all known sensors, inputs and outputs. This menu allows the user to assign any choice appearing on the list to the selected contact. It should be clear that the ability to quickly select a new contact from a menu of available inputs and outputs provides a highly intuitive interface to users, rendering the ladder logic programming technique more accessible to novices and those unfamiliar with computer programming.

Figure 16:
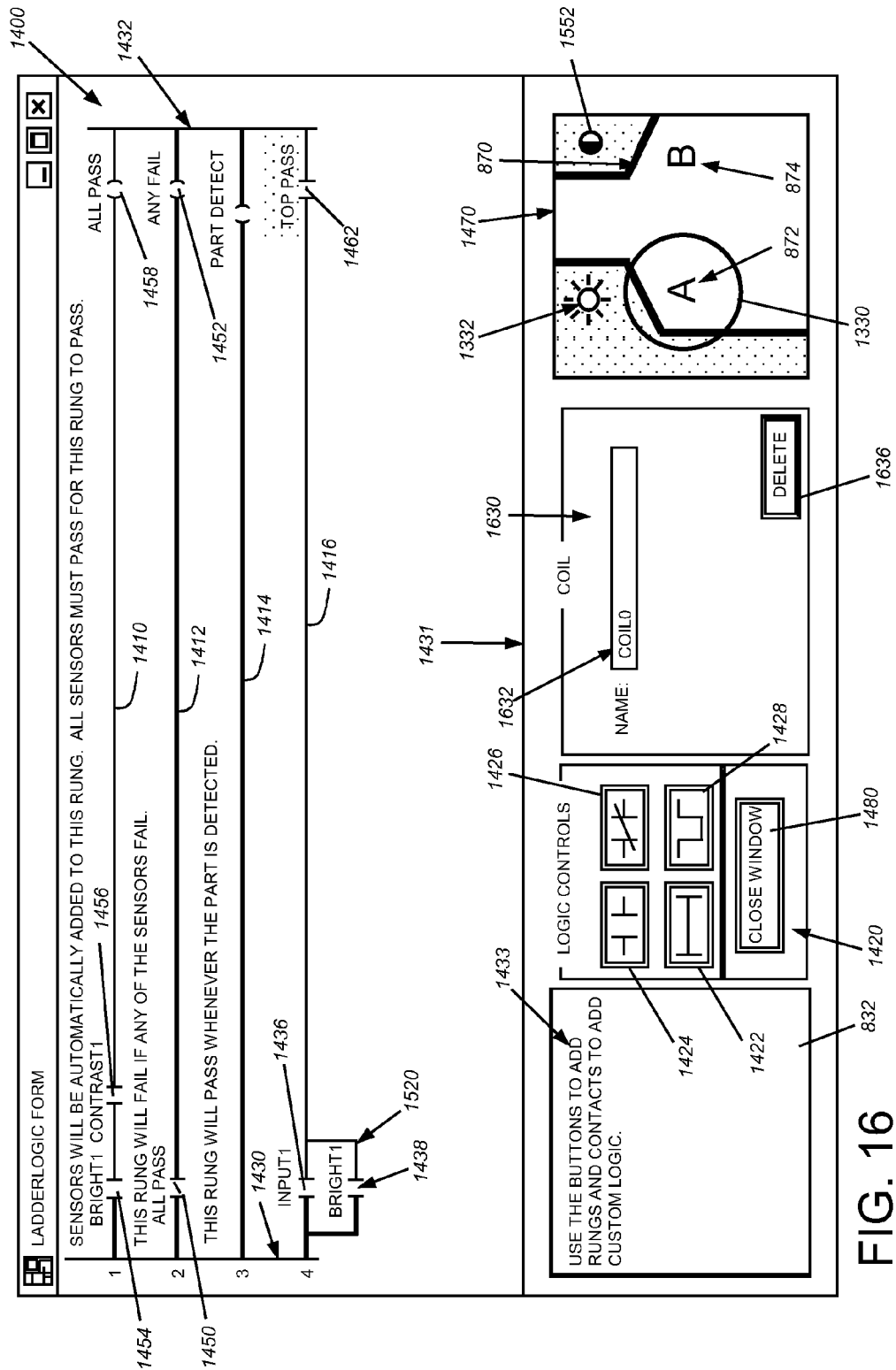
FIG. 16 is a diagram of the logic programming window of FIG. 14 showing a completed user-defined logic rung and corresponding assignment of an output/result coil to the rung.

Referring now to the enlarged screen of FIG. 16, coils, representing outputs, are assigned similarly to contacts. A coil assignment box 1630 is called up by clicking on the coil (1462). The box 1630 indicates the current name for the highlighted coil or allows the user to create a name for the output—in this example "Top Pass" This name can be edited or deleted (delete button 1636). In general, each ring includes a discrete coil. Two rungs cannot share the same coil name as this cause a conflict in outcomes. However, any coil can be repeatedly assigned as a contact in any rung, any number of times.

Referring generally to FIGS. 14, 14A, 15 and 16, the image window 1470 at the lower right of each control pane 831, 1431 reveals an image 870 corresponding to that appearing in the image frame window 780. Thus, when the GUI 164 is operating in video or snapshot mode, the image 870 is a live image captured by a selected sensor to which the GUI is currently connected. In filmstrip mode, the displayed image is a target image from the filmstrip thumbnails. Notably, by clicking on a given input (Bright1, for example in FIGS. 14 and 14A), the image portion that contains this element (sensor circle 1330, located on image feature 872) is displayed in the image window 1470. This allows the user to easily track and correlate actual sensor elements with the viewed or recorded image, thereby making programming with these elements easier and more-intuitive. As shown in FIG. 15, the user highlights the Contrast1 sensor 1528, which reveals a sensor circle 1550 centered around the image feature 874. When a particular contact is highlighted, the image typically shifts within the window 1470 to center the selected sensor element within its field of view. The size of the window 1470 is highly variable. It is typically sized small enough so as to allow room to build the ladder relationship, but large enough to reveal the sensor element on an image at a viewable size. In this example, clicking on Contrast1 1528 causes the image 870 to re-center upon the contrast sensor 1550. The previously selected Bright1 feature 1330 (shown in phantom) is still partially displayed within the window. In some embodiments, all sensors on an image may continue to be displayed, while the selected one is centered. In other embodiments, only the highlighted contact's feature is displayed in the image window 1470. Note the "contrast" icon appearing above the element 1550.

5. Vision Detector Output Setup

Figure 17:
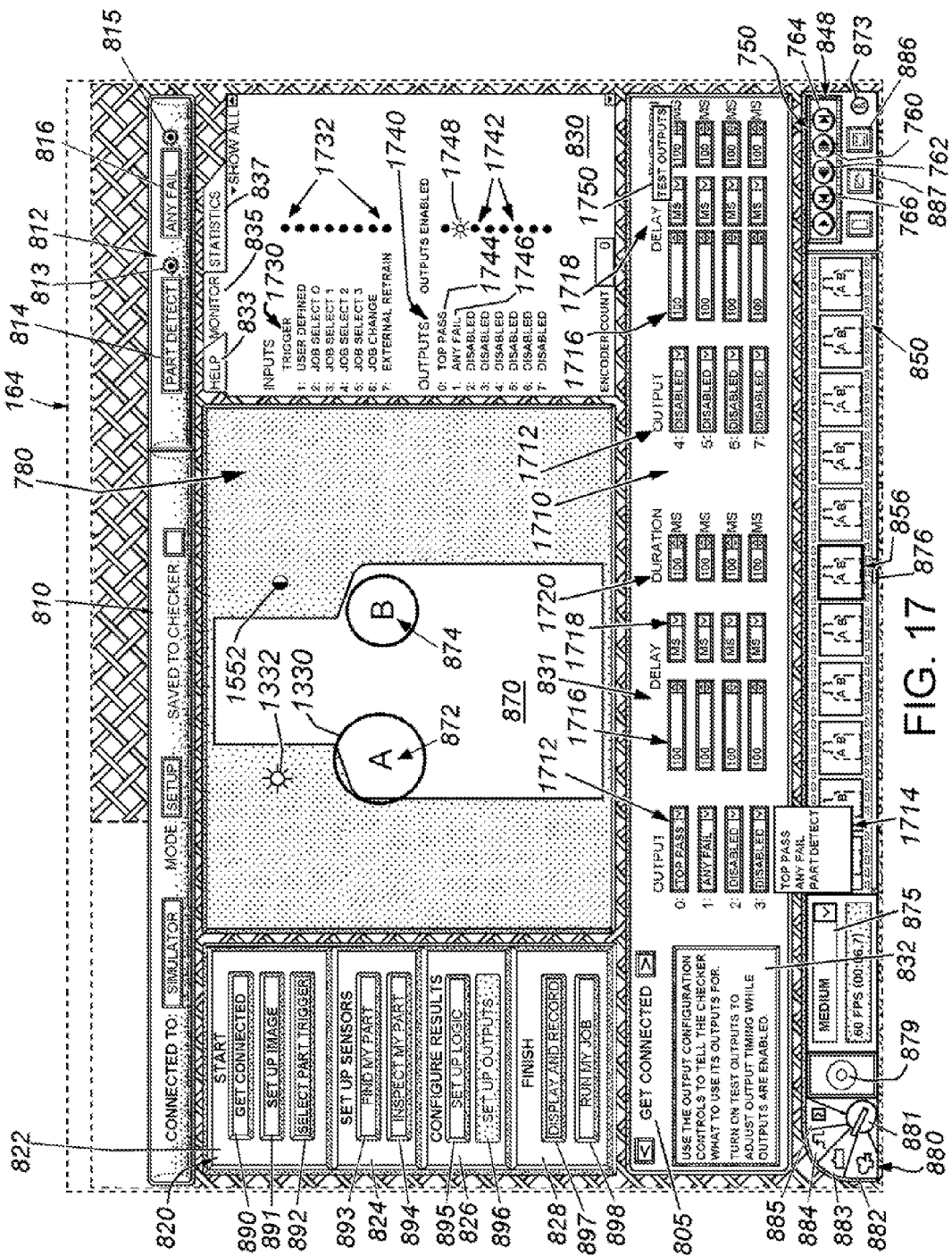
FIG. 17 is a diagram of the GUI display in the setting-up of outputs mode according to an illustrative embodiment.
Figure 18:
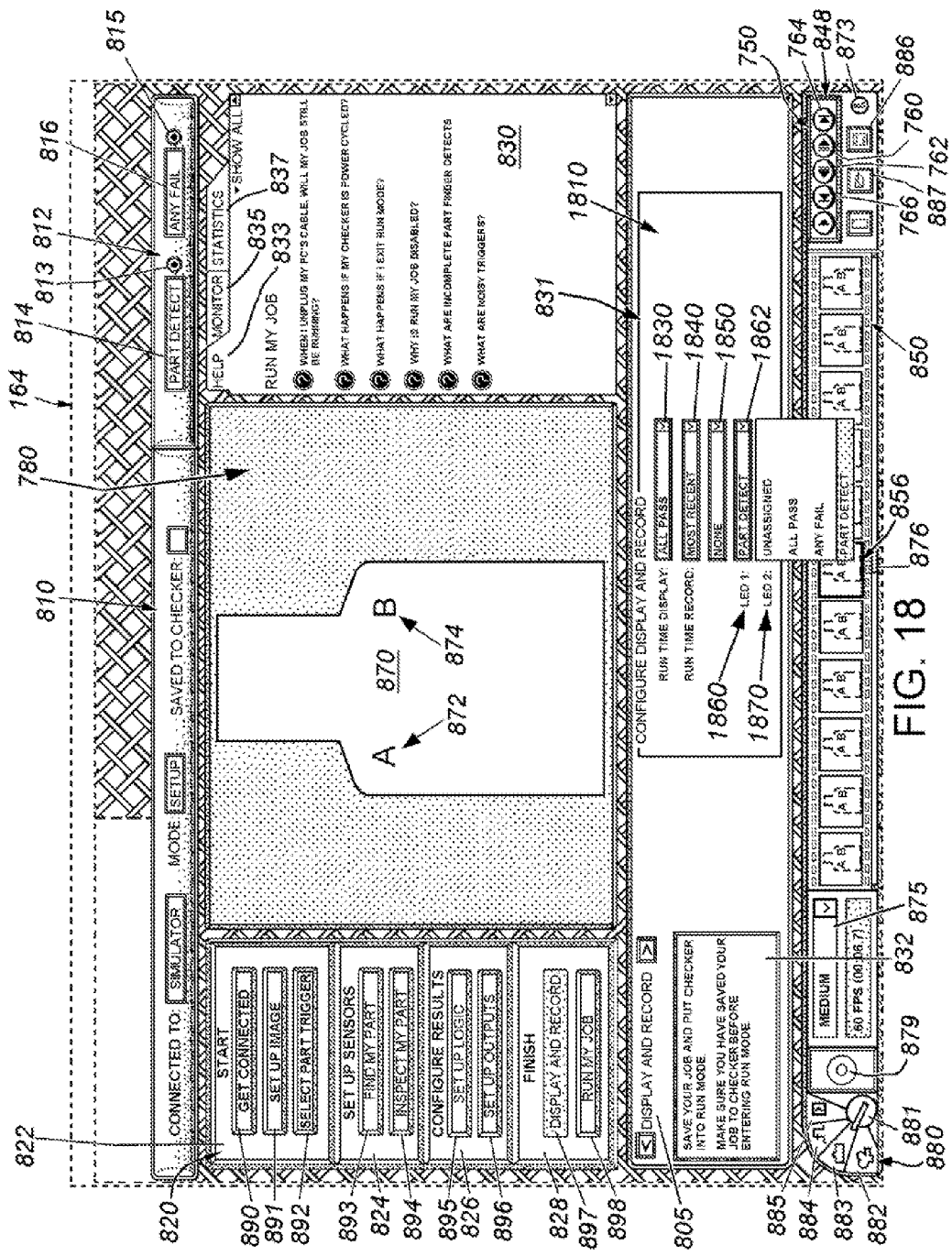
FIG. 18 is a diagram of the GUI display in the display and record configuration mode, just prior to run mode, according to an illustrative embodiment.

Once the logic rungs are configured, the user can close the logic screen (close button 1480) and set up the outputs that will be enabled by the logical results. Reference is now made to the GUI 164 as shown in FIG. 17. The user clicks the Set Up Outputs button 896 that succeeds the Set Up Logic button 895 in the Configure Results box 826. This button generates the Output box 1710 in the lower control pane 831. Within this box, the user is presented with a column of boxes 1712, each having a drop-down menu 1714 that allows the user to select from the list of coil names from the logic established from the previous logic-building step. Each coil can be assigned to an output, herein simply identified as Output 0, Output 1, Output 2, etc. Any non-selected output is identified as "Disabled." When programmed into a vision detector, the output causes the vision detector to signal or perform a given function. That function can be achieved by a onboard component of the detector, such as an alarm buzzer or light, or by an interconnected component, such as a reject actuator or conveyor line stop-switch. Each output is assigned a delay, based upon an adjacent Delay box in a column 1716. Each delay box allows the user to increment or decrement the delay using a conventional up/down arrow as shown. The delay is based upon preselected time units that can be chosen from milliseconds (as shown, seconds or another user-selected time metric. The duration of the output is chosen using increments of milliseconds (other timescales are expressly contemplated) in the adjacent boxes of a Duration column 1720. A conventional up/down arrow provides easy adjustment in predetermined increments.

Once set, the operation of the outputs can be monitored in the information pane 830, by opening the Monitor tab 835 as shown. This tab displays a list 1730 of predefined Inputs (triggers), each illuminating a simulated LED, when active. These triggers are set up in the connection step via box 822 and button 892. The monitor tab 835 also displays a list 1740 of selected Outputs. Active outputs are indicated by illuminating adjacent, simulated LEDs 1742. In this example, the selected Outputs listed are Top Pass 1744 and Any Fail 1746. The LED 1748 associated with Any Fail is illuminated, indicating the existence of a failed part. This arrangement allows a user to quickly set up appropriate outputs and monitor results, either in real time, or during the playback of a recorded filmstrip. A Test Outputs 1750 button allows the user to run through the program and check the setup for proper operation.

5. Vision Detector Display and Record/Run Mode

Once outputs are set, the user can click the Display and Record button 897 in the lowermost, Finish box 828 of the setup pane 820. This button generates the Display and Record box 1810 in the control pane 831. This is an option that allows the user to display and make recordings of the images of certain viewed parts during runtime operation. In general, users may want to limit the display and recording only parts that fail (or fail in a certain way) so as to focus-in on the reasons for a given part failure, or to isolate a programming error. The box 1810 presents the user with a menu 1812 that allows him or her to select the criteria (output) that will cause a part image to be displayed during runtime. In this example, the output All Pass is chosen. A record menu 1840 allows the user to select the recording parameters used during runtime operation. For example, the window is set to most recent, so that the most recent captured images are recorded, up to a maximum duration. A third menu 1850 allows the user to select stored recordings. The menu indicates that none are currently available.

The window 1810 also includes two boxes entitled LED 1 and LED 2, which allow the user to assign each of the two simulated LEDs 813 and 815 in the upper strip 812 to a respective output. Each box contains a drop-down menu (1862 for LED 1) that contains all available outputs. In this example LED 1 is assigned to Part Detect. This is indicated in the text 814 adjacent to LED 1 (813). Likewise, the user has assigned the output Any Fail to LED 2 (815) and the adjacent text 816 indicates this assignment. LED 1 and LED 2 provide a readily viewed indicator of the status of two outputs. These outputs are completely user-defined, and can represent any desired status including the pass or failure of parts, or differentiation between different types of parts (e.g. cherry and apple). While the GUI of this embodiment supports at least two output indicators in the upper strip 812, the number of viewed status indicators which the GUI provides is highly variable.

Once the runtime display parameters and recording parameters have been configured, the user can click the final button in the setup pane 820—the Run My Job button 898, which activates runtime operation. The upper strip 810 then indicates Run Mode. At this time, the GUI displays selected image frames and records those frames for playback on a filmstrip, or another format.

It should be clear that the foregoing description of the above-described GUI that is applicable to a machine vision detector system and other machine vision systems affords the user a versatile and relatively intuitive vehicle for configuring and testing such systems.

The foregoing has been a detailed description of illustrative embodiments of the invention. Various modifications and additions can be made without departing from the spirit and scope thereof. For example, the layout and titles of the GUI windows, panes, boxes and buttons are highly variable. The sequential nature of the setup and run buttons can be varied to accommodate different sequences of steps employed in other types of machine vision systems. Likewise additional buttons used to call up other functions that are unique to a particular type of machine vision system can be added where appropriate (and buttons that are unneeded in different types of machine vision can be omitted). Also, while the setup and run buttons are arrayed in a vertical column aside an image frame window herein, they can be provided across the bottom or top in a horizontal arrangement. Similarly any GUI pane or window can be relocated as desired to provide further convenience for the user. Boxes may be substituted with separate panes or screens the "pop-up" when called for where appropriate so as to provide the user with further working room (such as the Ladder Logic screen). Furthermore, it is contemplated that any function or component herein can be implemented using electronic hardware, software consisting of program instructions executing on a computer, or a combination of hardware and software. Accordingly, this description is meant to be taken only by way of example, and not to otherwise limit the scope of the invention.

What is claimed is:

1. A non-transitory graphical user interface (GUI) display for setup and testing of machine vision systems comprising:
    an image frame pane in which recorded and real time images of an object acquired by an interconnected vision system are displayed as discrete frames;
    at least one box in which the user performs interface functions in connection with each of a plurality of different and discrete procedures to set up and run a machine vision job using the interconnected vision system; and
    a plurality of buttons, arranged in a sequential order across a portion of the GUI, the buttons defining each of the plurality of different and discrete procedures, the sequential order corresponding to a predetermined order in which the procedures occur to set up and run a machine vision job, wherein at least one of the plurality of buttons provide interface functions so that the user can configure rungs of ladder logic that uses results provided by the vision system.

2. The non-transitory GUI display as set forth in claim 1 wherein the buttons include a first set of buttons that provide interface functions in the box so that the user can identify the machine vision job, connect to the vision system, and set up imaging functions in the vision system.

3. The non-transitory GUI display as set forth in claim 2 wherein the buttons include a second set of buttons that provide interface functions in the box so that the user can train the vision system to locate an object and identify predetermined features on the object.

4. The non-transitory GUI display as set forth in claim 3 wherein the second set of buttons provides controls that allow the user to select locators that allow the object to be located in the image field of view and sensors that allow predetermined parameters of the features of the object to be identified by the vision system and a resulting high or low value to be assigned to the results.

5. The non-transitory GUI display as set forth in claim 3 wherein the buttons include a third set of buttons that provide interface functions so that the user can configure rungs of ladder logic that uses results provided by the vision system on the features as contacts on the rungs to provide discrete high or low output coils for each of the rungs.

6. The non-transitory GUI display as set forth in claim 5 wherein the output coils are constructed and arranged to be provided as contacts on predetermined of the rungs.

7. The non-transitory GUI display as set forth in claim 6 wherein the rungs of ladder logic are displayed on a screen having an image window that presents a thumbnail of a subject image of the object including graphical representations of sensors associated with selected of the contacts, wherein highlighting each of the contacts causes the window to display the associated graphical representation of the sensor associated with the contact.

8. The non-transitory GUI display as set forth in claim 6 wherein each of the contacts is constructed and arranged so as to be highlighted and thereby display a menu of properties, the menu of properties being selectable so as to change the properties of the highlighted contact.

9. The non-transitory GUI display as set forth in claim 8 wherein the menu of properties includes inversion of a contact, association of a contact with sensors or another input source and deletion of a contact from a selected of the rungs.

10. The non-transitory GUI display as set forth in claim 6 further comprising an OR button that applies an OR branch to a selected of the rungs.

11. The non-transitory GUI display as set forth in claim 5 wherein the third set of buttons provide interface functions in the box so that the user can configure outputs that interconnect with alarms, actuators and physical devices based upon the coils.

12. The non-transitory GUI display as set forth in claim 11 wherein the buttons include a fourth set of buttons having interface functions so that the user can define parameters of image frame recordings associated with a runtime operation of the job and run the job.

13. The non-transitory GUI display as set forth in claim 11 wherein the buttons include a fourth set of buttons having interface functions so that the user can define visual signals that appear on the interface to indicate a predetermined status based upon selected of the coils.

14. The non-transitory GUI display as set forth in claim 13 wherein the visual signals comprise simulated LEDs and a title of the predetermined status adjacent to each of the simulated LEDs.

15. The non-transitory GUI display as set forth in claim 14 wherein the simulated LEDs are located on a strip overlying the image frame window.

16. The non-transitory GUI display as set forth in claim 1 wherein the plurality of buttons are arranged in a sequential order across a portion of the GUI display, the buttons defining each of the plurality of different and discrete procedures, the sequential order corresponding to a predetermined order in which the procedures occur to set up and run a machine vision job.

17. A method for setting up and testing a machine vision system using graphical user interface (GUI) display comprising the steps of:
    displaying, in an image frame pane, recorded and real time images of an object acquired by an interconnected vision system as discrete frames;
    performing interface functions in connection with each of a plurality of different and discrete procedures to set up and run a machine vision job using the interconnected vision system; and
    activating a plurality of buttons, arranged in a sequential order across a portion of the GUI, the buttons defining each of the plurality of different and discrete procedures, the sequential order corresponding to a predetermined order in which the procedures occur to set up and run a machine vision job, wherein at least one of the plurality of buttons provide interface functions so that the user can configure rungs of ladder logic that uses results provided by the vision system.

18. A non-transitory graphical user interface (GUI) display for setup and testing of machine vision systems comprising:

an image frame pane in which recorded and real time images of an object acquired by an interconnected vision system are displayed as discrete frames;

a filmstrip window that displays individual thumbnail images of a series of time-based sequential image frames of the recorded images acquired by the interconnected vision system;

wherein a first group of the thumbnail images are highlighted in a first discrete color or pattern so as to identify a first predetermined detected feature on the object in connection with the recorded images associated with the thumbnail images; and a plurality of buttons, arranged in a sequential order across a portion of the GUI, the buttons defining each of the plurality of different and discrete procedures, the sequential order corresponding to a predetermined order in which the procedures occur to set up and run a machine vision job, wherein at least one of the plurality of buttons provide interface functions so that the user can configure rungs of ladder logic that uses results provided by the vision system.

19. The non-transitory GUI display as set forth in claim 18 wherein a second group of the thumbnail images are highlighted in a second discrete color or pattern dissimilar from the first discrete color or pattern so as to identify a second predetermined detected feature on the object in connection with the recorded images associated with the thumbnail images.

20. The non-transitory GUI display as set forth in claim 19 wherein at least one of the first group and the second group represent all images associated with the object.

21. The non-transitory GUI display as set forth in claim 19 wherein at least one of the first group and the second group comprise only images determined to have the first predetermined detected feature and second predetermined detected feature, respectively.

22. The non-transitory GUI display as set forth in claim 19 wherein the first predetermined feature and second predetermined feature each respectively indicate a first type of object and a second type of object.

23. The non-transitory GUI display as set forth in claim 19 wherein the first predetermined feature and the second predetermined feature each respectively indicate a failed object and a passing object.

* * * * *